(12) United States Patent
Kanzaki et al.

(10) Patent No.: US 12,249,462 B2
(45) Date of Patent: *Mar. 11, 2025

(54) MULTILAYER CERAMIC ELECTRONIC COMPONENT

(71) Applicant: Murata Manufacturing Co., Ltd., Nagaokakyo (JP)

(72) Inventors: Taisuke Kanzaki, Nagaokakyo (JP); Kosuke Onishi, Nagaokakyo (JP); Akitaka Doi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,421

(22) Filed: Jan. 25, 2024

(65) Prior Publication Data
US 2024/0170218 A1 May 23, 2024

Related U.S. Application Data

(63) Continuation of application No. 18/124,019, filed on Mar. 21, 2023, now Pat. No. 11,915,877, which is a (Continued)

(30) Foreign Application Priority Data

Dec. 25, 2019 (JP) .................................. 2019-233671

(51) Int. Cl.
H01G 4/248 (2006.01)
H01G 4/008 (2006.01)
(Continued)

(52) U.S. Cl.
CPC ............. *H01G 4/248* (2013.01); *H01G 4/008* (2013.01); *H01G 4/012* (2013.01);
(Continued)

(58) Field of Classification Search
CPC ...... H01G 4/008; H01G 4/012; H01G 4/1227; H01G 4/232; H01G 4/248; H01G 4/30
See application file for complete search history.

(56) References Cited

U.S. PATENT DOCUMENTS 11,636,980 B2 * 4/2023 Kanzaki ................. H01G 4/248
361/301.4
11,915,877 B2 * 2/2024 Kanzaki ................... H01G 4/30
(Continued)

OTHER PUBLICATIONS

Kanzaki et al., "Multilayer Ceramic Electronic Component", U.S. Appl. No. 18/124,019, filed Mar. 21, 2023.

*Primary Examiner* — Nathan Milakovich
(74) *Attorney, Agent, or Firm* — Keating & Bennett, LLP

(57) ABSTRACT

A multilayer ceramic electronic component includes a multilayer body and an external electrode on each of both end surfaces of the multilayer body. The external electrode includes an underlying electrode layer and a plating layer that is disposed on the underlying electrode layer. The underlying electrode layer includes Ni as a first metal component, Sn as a second metal component, and a ceramic material, and includes an alloy portion that is provided around the ceramic material and includes an alloyed Ni defining the first metal component and an alloyed Sn defining the second metal component.

17 Claims, 17 Drawing Sheets

Related U.S. Application Data continuation of application No. 17/101,026, filed on Nov. 23, 2020, now Pat. No. 11,636,980.

(51) Int. Cl.
*H01G 4/012* (2006.01)
*H01G 4/12* (2006.01)
*H01G 4/232* (2006.01)
*H01G 4/30* (2006.01)

(52) U.S. Cl.
CPC ........... *H01G 4/1227* (2013.01); *H01G 4/232* (2013.01); *H01G 4/30* (2013.01)

(56) References Cited

U.S. PATENT DOCUMENTS

2019/0392991 A1* 12/2019 Harada ................... H01G 4/228
2024/0312714 A1* 9/2024 Lee .......................... H01G 4/30

* cited by examiner

CROSS-SECTIONAL VIEW TAKEN ALONG LINE IV-IV

MULTILAYER CERAMIC ELECTRONIC COMPONENT

CROSS REFERENCE TO RELATED APPLICATIONS

This application claims the benefit of priority to Japanese Patent Application No. 2019-233671 filed on Dec. 25, 2019. The entire contents of this application are hereby incorporated herein by reference.

BACKGROUND OF THE INVENTION

1. Field of the Invention

The present invention relates to a multilayer ceramic electronic component.

2. Description of the Related Art

In recent years, multilayer ceramic electronic components represented by multilayer ceramic capacitors have been increasingly used in more severe environments than conventional environments.

In order to deal with the moisture resistance load caused by infiltration of moisture from an external electrode portion under such a circumstance, a multilayer ceramic capacitor as described below has been proposed.

Specifically, the proposed multilayer ceramic capacitor prevents formation of gaps between a ceramic body and an external electrode to thereby improve the adhesiveness between the external electrode and the ceramic body. As a multilayer ceramic capacitor having such a configuration, for example, Japanese Patent Laid-Open No. 05-003134 discloses a technique for using an electrically conductive paste for an external electrode connected to internal electrodes stacked inside a multilayer ceramic capacitor. In this electrically conductive paste, ceramic powder forming a ferroelectric ceramic layer for the multilayer ceramic capacitor is dispersed as a coexisting material.

The multilayer ceramic capacitor disclosed in Japanese Patent Laid-Open No. 05-003134, however, causes the following problems. Specifically, when an external electrode contains an electrically conductive paste in which ceramic powder forming a ferroelectric ceramic layer for the multilayer ceramic capacitor is dispersed as a coexisting material, the coexisting material (barium titanate) in the external electrode between Ni particles as main components of the external electrode, thereby preventing the reaction between the Ni particles. Thus, densification of metal in the external electrode may be suppressed. As a result, gaps are more likely to occur in the external electrode, thereby leading to insulation deterioration caused by moisture infiltrating during plating and remaining in the gaps.

SUMMARY OF THE INVENTION

Preferred embodiments of the present invention provide multilayer ceramic electronic components, in each of which formation of gaps is able to be reduced or prevented by densification of metal in an external electrode even when ceramic materials as coexisting materials are dispersed in the external electrode.

A multilayer ceramic electronic component according to a preferred embodiment of the present invention includes a multilayer body including a plurality of ceramic layers that are stacked, the multilayer body including a first main surface and a second main surface that face each other in a height direction, a first side surface and a second side surface that face each other in a width direction orthogonal or substantially orthogonal to the height direction, and a first end surface and a second end surface that face each other in a length direction orthogonal or substantially orthogonal to the height direction and the width direction; a first internal electrode layer that is disposed on each of the ceramic layers and exposed on the first end surface; a second internal electrode layer that is disposed on each of the ceramic layers and exposed on at least one surface of the second end surface, the first side surface, and the second side surface; a first external electrode that is connected to the first internal electrode layer and disposed on the first end surface; and a second external electrode that is connected to the second internal electrode layer and disposed on the at least one surface on which the second internal electrode layer is exposed. The first external electrode includes a first underlying electrode layer and a plurality of first plating layers located on the first underlying electrode layer. The second external electrode includes a second underlying electrode layer and a plurality of second plating layers located on the second underlying electrode layer. The first underlying electrode layer and the second underlying electrode layer each contain Ni as a first metal component, Sn as a second metal component, and a ceramic material, and each include an alloy portion that is provided around the ceramic material and includes an alloyed Ni defining the first metal component and an alloyed Sn defining the second metal component.

According to preferred embodiments of the present invention, multilayer ceramic electronic components are able to be provided, in each of which formation of gaps is able to be reduced or prevented by densification of metal in an external electrode even when ceramic materials as coexisting materials are dispersed in the external electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

First Preferred Embodiment

Figure 1:
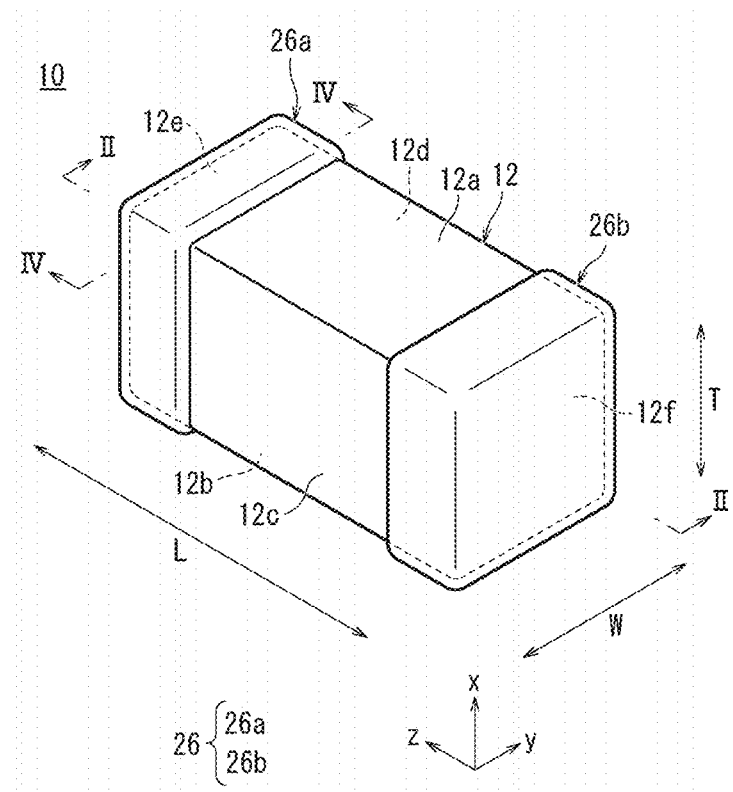
FIG. 1 is an external perspective view showing an example of a multilayer ceramic capacitor according to a first preferred embodiment of the present invention.
Figure 2:
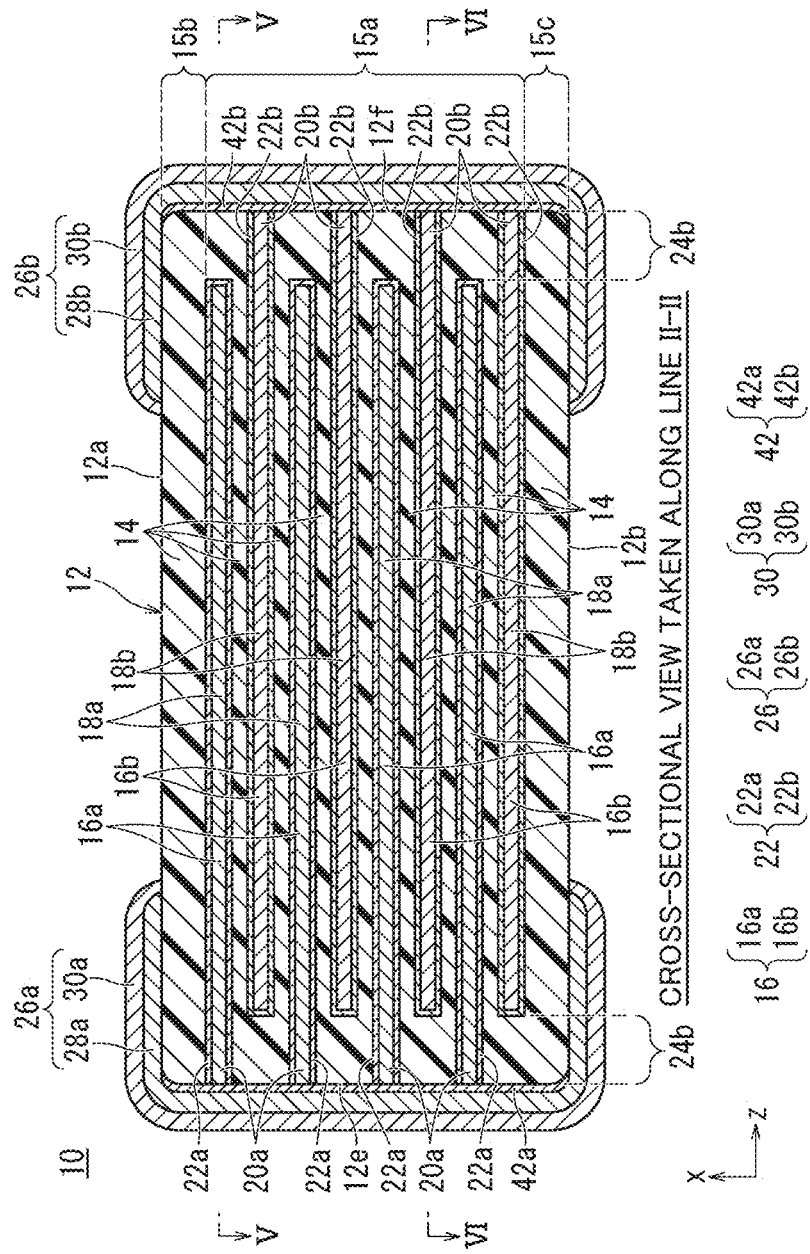
FIG. 2 is a cross-sectional view taken along a line II-II in FIG. 1.
Figure 3:
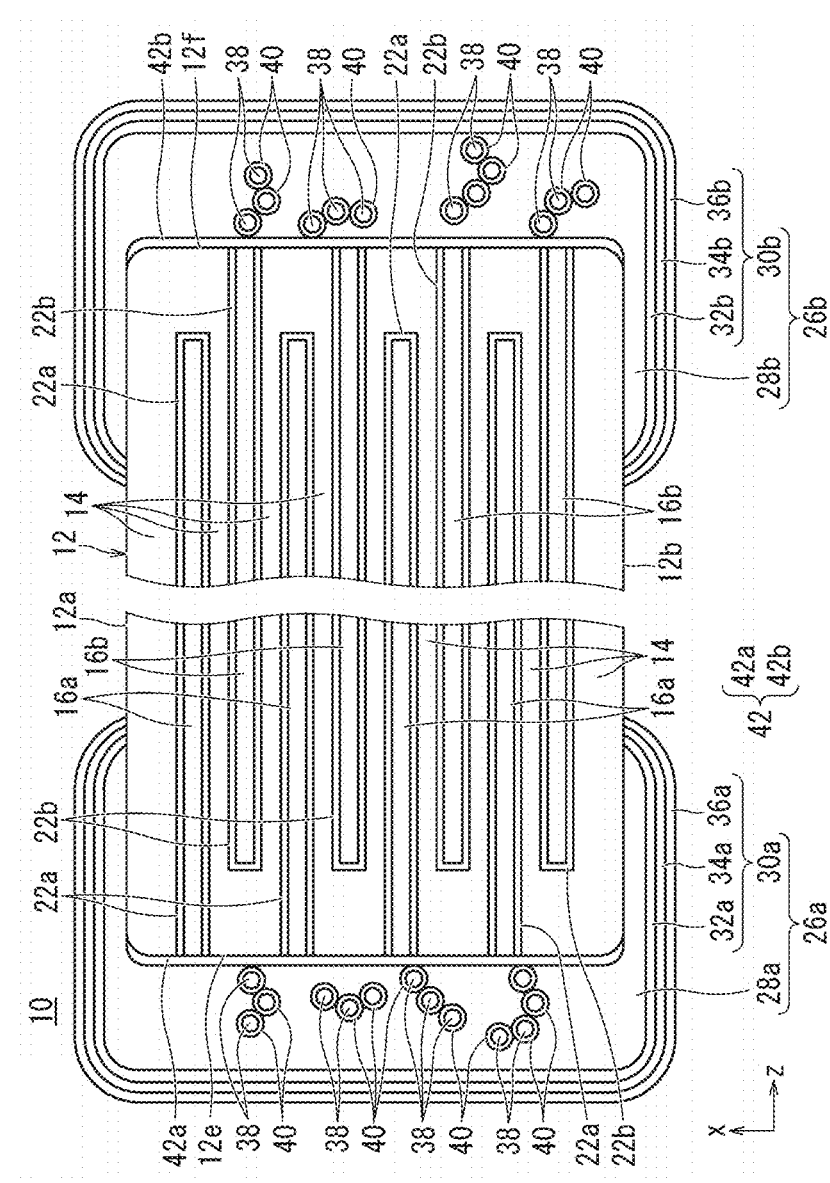
FIG. 3 is a schematic cross-sectional view of external electrodes located on both end surfaces in FIG. 2 and regions therearound in an enlarged manner.
Figure 4:
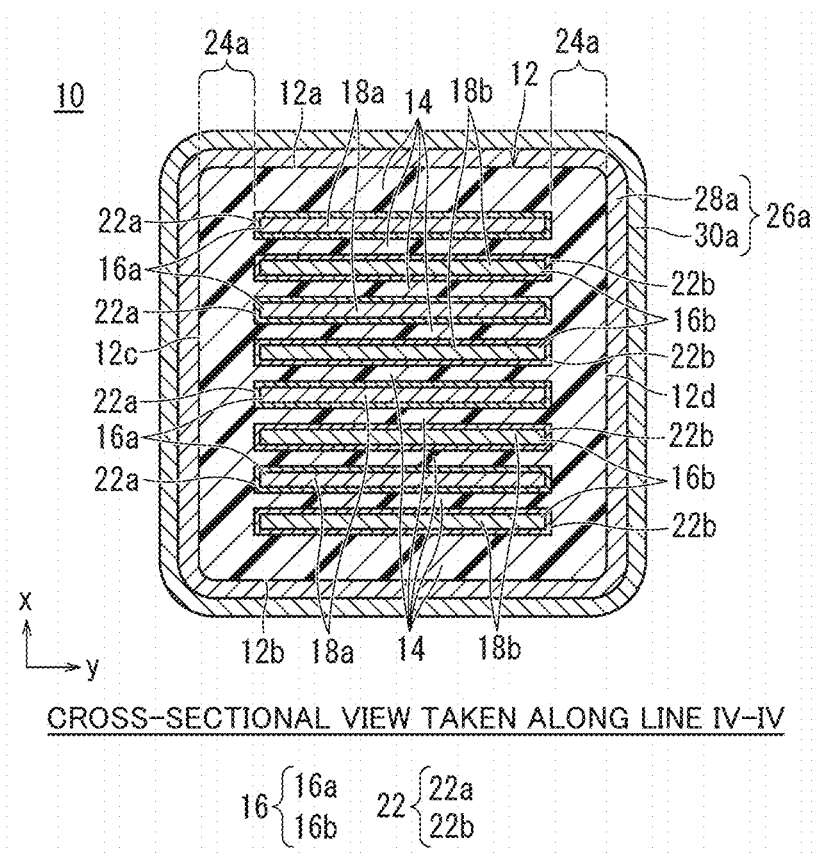
FIG. 4 is a cross-sectional view taken along a line IV-IV in FIG. 1.
Figure 5:
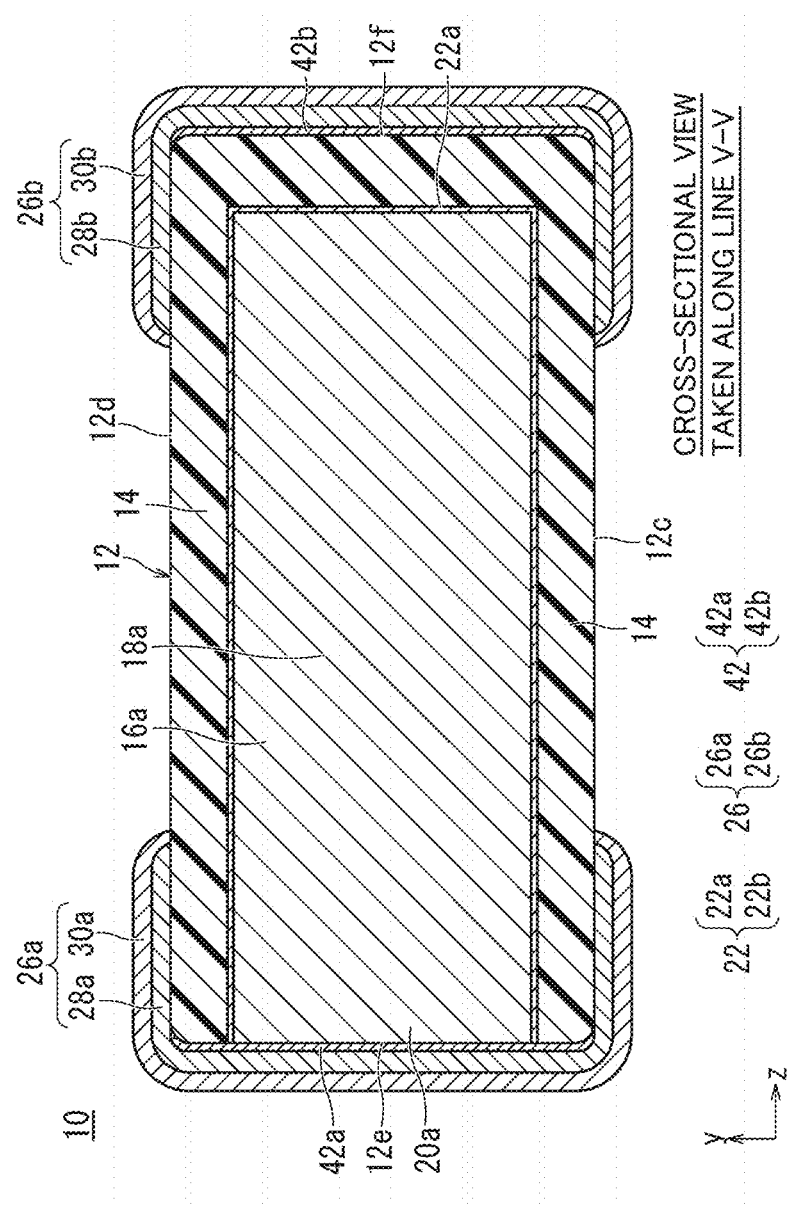
FIG. 5 is a cross-sectional view taken along a line V-V in FIG. 2.
Figure 6:
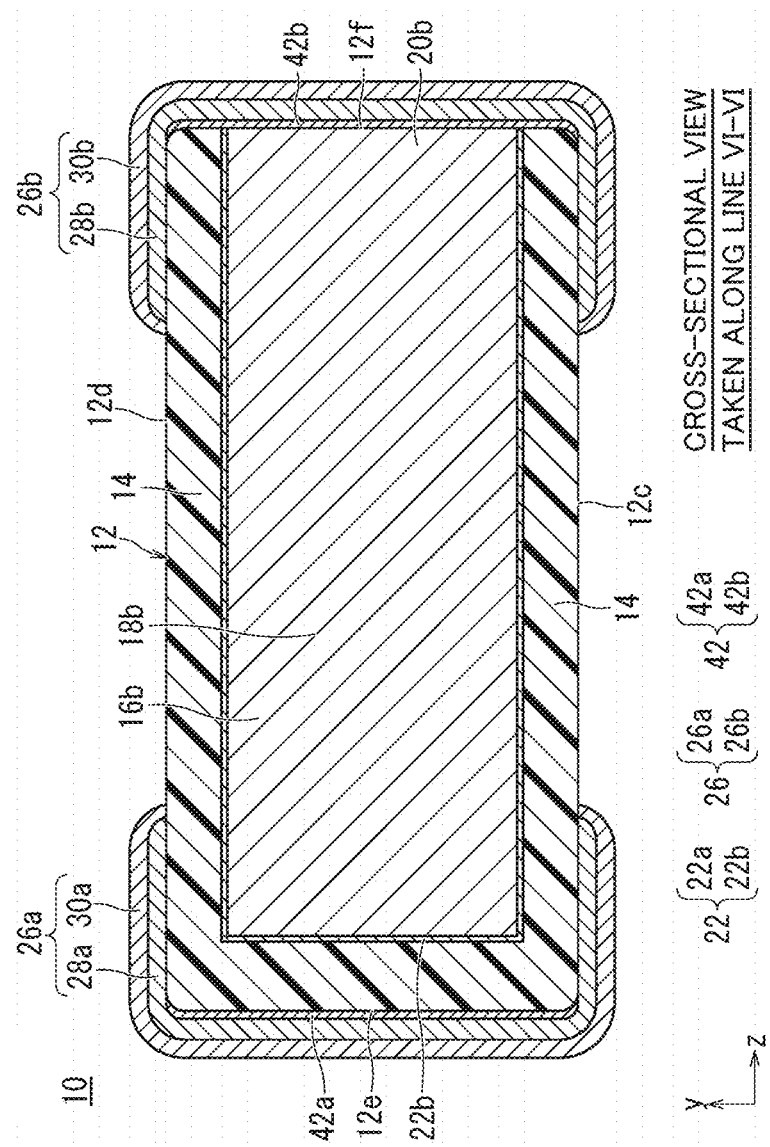
FIG. 6 is a cross-sectional view taken along a line VI-VI in FIG. 2.

A multilayer ceramic capacitor will be described as an example of a multilayer ceramic electronic component according to a first preferred embodiment of the present invention. FIG. 1 is an external perspective view showing an example of a multilayer ceramic capacitor according to the first preferred embodiment of the present invention. FIG. 2 is a cross-sectional view taken along a line II-II in FIG. 1. FIG. 3 is a schematic cross-sectional view of external electrodes located on both end surfaces in FIG. 2 and regions therearound in an enlarged manner. FIG. 4 is a cross-sectional view taken along a line IV-IV in FIG. 1. FIG. 5 is a cross-sectional view taken along a line V-V in FIG. 2. FIG. 6 is a cross-sectional view taken along a line VI-VI in FIG. 2.

As shown in FIGS. 1 to 4, a multilayer ceramic capacitor 10 includes a multilayer body 12 having a rectangular or substantially rectangular parallelepiped shape.

Multilayer body 12 includes a plurality of stacked ceramic layers 14 and a plurality of internal electrode layers 16. Multilayer body 12 also includes a first main surface 12a and a second main surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y. Multilayer body 12 includes corner portions and ridge portions, each of which is preferably rounded. In this case, the corner portion corresponds to a portion at which three adjoining planes of the multilayer body cross each other. The ridge portion corresponds to a portion at which two adjoining planes of the multilayer body cross each other. Furthermore, first main surface 12a, second main surface 12b, first side surface 12c, second side surface 12d, first end surface 12e, and second end surface 12f each may be partially or entirely provided with, for example, projections and recesses, and the like.

The number of ceramic layers 14 including outer layers is preferably 15 or more and 700 or less, for example.

In the stacking direction extending along a line connecting first main surface 12a and second main surface 12b, multilayer body 12 includes an effective layer portion 15a in which internal electrode layers 16 face each other, a first outer layer portion 15b located between first main surface 12a and one of internal electrode layers 16 that is closest to first main surface 12a, and a second outer layer portion 15c located between second main surface 12b and one of internal electrode layers 16 that is closest to second main surface 12b.

First outer layer portion 15b includes a plurality of ceramic layers 14 that are located on the first main surface 12a side of multilayer body 12 and also located between first main surface 12a and one of internal electrode layers 16 that is closest to first main surface 12a.

Second outer layer portion 15c includes a plurality of ceramic layers 14 that are located on the second main surface 12b side of multilayer body 12 and also located between second main surface 12b and one of internal electrode layers 16 that is closest to second main surface 12b.

A region sandwiched between first outer layer portion 15b and second outer layer portion 15c is effective layer portion 15a.

Although the dimensions of multilayer body 12 are not particularly limited, it is preferable that, for example, the dimension of multilayer body 12 in length direction z is about 0.2 mm or more and about 10.0 mm or less, the dimension of multilayer body 12 in width direction y is about 0.1 mm or more and about 10.0 mm or less, and the dimension of multilayer body 12 in height direction x is about 0.1 mm or more and about 5.0 mm or less.

Ceramic layer 14 can be made of a dielectric material such as a ceramic material, for example. Such a dielectric material can be made of dielectric ceramic containing components such as $BaTiO_3$, $CaTiO_3$, $SrTiO_3$, or $CaZrO_3$, for example. When the above-described dielectric material is contained as a main component, a material additionally containing a sub-component (such as an Mn compound, an Fe compound, a Cr compound, a Co compound, or an Ni compound, for example) that is less in content than the main component may be used in accordance with the desired characteristics for multilayer body 12.

When a piezoelectric ceramic is used for multilayer body 12, the multilayer ceramic electronic component defines and functions as a ceramic piezoelectric element. A specific example of the piezoelectric ceramic material may be a lead zirconate titanate (PZT)-based ceramic material or the like.

Furthermore, when a semiconductor ceramic is used for multilayer body 12, the multilayer ceramic electronic component defines and functions as a thermistor element. A specific example of the semiconductor ceramic material may be a spinel-based ceramic material or the like, for example.

Furthermore, when magnetic ceramic is used for multilayer body 12, the multilayer ceramic electronic component defines and functions as an inductor element. When the multilayer ceramic electronic component defines and functions as an inductor element, internal electrode layer 16 is a coil-shaped conductor. A specific example of the magnetic ceramic material may be a ferrite ceramic material or the like, for example.

The thickness of fired ceramic layer 14 is preferably about 0.4 μm or more and about 10.0 μm or less, for example.

As shown in FIGS. 5 and 6, multilayer body 12 includes, as a plurality of internal electrode layers 16, a plurality of first internal electrode layers 16a and a plurality of second internal electrode layers 16b, each of which has a rectangular or approximately rectangular shape, for example. The plurality of first internal electrode layers 16a and the plurality of second internal electrode layers 16b are buried so as to be alternately arranged at regular intervals in the stacking direction of multilayer body 12. First internal electrode layers 16a and second internal electrode layers 16b may be disposed in parallel or substantially in parallel with a mounting surface or may be disposed to be vertical to the mounting surface.

Each first internal electrode layer 16a includes a first facing electrode portion 18a that faces second internal electrode layer 16b, and a first extending electrode portion 20a located on one end side of first internal electrode layer 16a and extending from first facing electrode portion 18a to first end surface 12e of multilayer body 12. First extending electrode portion 20a includes an end portion extending to first end surface 12e and exposed from first end surface 12e.

Each second internal electrode layer 16b includes a second facing electrode portion 18b that faces first internal electrode layer 16a, and a second extending electrode portion 20b located on one end side of second internal electrode layer 16b and extending from second facing electrode portion 18b to second end surface 12f of multilayer body 12. Second extending electrode portion 20b includes an end portion extending to second end surface 12f and exposed from second end surface 12f.

It is preferable that first facing electrode portion 18a of first internal electrode layer 16a and second facing electrode portion 18b of second internal electrode layer 16b each have a rectangular or substantially rectangular shape, but is not particularly limited. Also, each of corner portions of the rectangular or substantially rectangular shape may be rounded or may have an inclined shape (in a tapered shape, for example).

It is preferable that first extending electrode portion 20a of first internal electrode layer 16a and second extending electrode portion 20b of second internal electrode layer 16b each have a rectangular or substantially rectangular shape, but is not particularly limited. Also, each of corner portions of the rectangular or substantially rectangular shape may be rounded or may have in an inclined shape (in a tapered shape, for example).

First facing electrode portion 18a of first internal electrode layer 16a and first extending electrode portion 20a of first internal electrode layer 16a may have the same width, or one of the widths may be narrower than the other. Similarly, second facing electrode portion 18b of second internal electrode layer 16b and second extending electrode portion 20b of second internal electrode layer 16b may have the same width, or one of the widths may be narrower than the other.

Multilayer body 12 includes a side portion (W gap) 24a provided between first side surface 12c and one end of each of first facing electrode portion 18a and second facing electrode portion 18b in width direction y, and between second side surface 12d and the other end of each of first facing electrode portion 18a and second facing electrode portion 18b in width direction y. Furthermore, multilayer body 12 includes an end portion (L gap) 24b provided between second end surface 12f and one end of first internal electrode layer 16a that is opposite to first extending electrode portion 20a, and between first end surface 12e and one end of second internal electrode layer 16b that is opposite to second extending electrode portion 20b.

Internal electrode layer 16 contains electrically conductive materials made of, for example, metals such as Ni, Cu, Ag, Pd, or Au, or an alloy such as an Ag—Pd alloy containing at least one of these metals. Internal electrode layer 16 may further contain dielectric particles of the same composition base as that of ceramic contained in ceramic layer 14.

Internal electrode layer 16 is preferably made of a material containing Ni as the third metal component and Sn as the fourth metal component. Also, Ni as the third metal component and Sn as the third metal component may also be partially alloyed. Thus, alloying of Ni and Sn changes the state (an electrical barrier height) at and around the interface of internal electrode layer 16 with ceramic layer 14, thus contributing to an improvement in high-temperature load life. This results in multilayer ceramic capacitor 10 that has excellent reliability (improved in high-temperature load life) during voltage application. The fourth metal component may be an Sn material made of, for example, any one of metal containing Sn and an Sn compound, or, in place of Sn, may be tin oxide powder represented by Sno or $SnO_2$.

It is preferable that Ni as the third metal component is a main component while Sn as the fourth metal component is a sub-component.

In this case, assuming that the sum of Ni as the third metal component and Sn as the fourth metal component in internal electrode layer 16 is 100 mol, the content of Sn is preferably about 0.001 mol or more and about 0.1 mol or less, for example. When the content of Sn is about 0.001 mol or more, the effect of containing Sn is more effectively achieved. When the content of Sn is about 0.1 mol or less, the melting point of internal electrode layer 16 falls within a preferable range, so that problems, such as balling, are less likely to occur. The above-described state can be achieved by, adding, to an electrically conductive paste for internal electrode formation, Sn of the fourth metal component as a sub-component for Ni of the third metal component as a main component; or adding an Ni—Sn alloy to the electrically conductive paste for internal electrode formation.

As shown in FIGS. 2 to 6, it is preferable that the portion provided by alloying Ni as the third metal component and Sn as the fourth metal component includes an alloy layer 22 provided at an interface between ceramic layer 14 and internal electrode layer 16 so as to cover internal electrode layer 16. Alloy layer 22 includes a first alloy layer 22a and a second alloy layer 22b. First alloy layer 22a covers first internal electrode layer 16a, and second alloy layer 22b covers second internal electrode layer 16b. In this way, alloy layer 22 provided by alloying Ni and Sn is thus included to change the state (an electrical height) at and around the interface of internal electrode layer 16 with ceramic layer 14, and thus contribute to improvement in high-temperature load life. As a result, multilayer ceramic capacitor 10 having excellent reliability (improved in high-temperature load life) during voltage application is obtained.

To check alloy layer 22, the cross section of multilayer body 12 is polished (for example, to expose an LT cross section at ½ W position) and thereafter checked by WDX analysis for composition differences. Then, based on the composition differences, the range of alloy layer 22 can be specified. Furthermore, a portion of the cross section (including ceramic layer 14 and internal electrode layer 16) is sliced and then subjected to TEM analysis. Thus, the composition differences can be more specifically checked.

The thickness of internal electrode layer 16 is preferably about 0.2 µm or more and about 2.0 µm or less, for example. Also, the number of internal electrode layers 16 is preferably 15 or more and 200 or less, for example.

An external electrode 26 is disposed on the first end surface 12e side and the second end surface 12f side of multilayer body 12. External electrode 26 includes a first external electrode 26a and a second external electrode 26b.

First external electrode 26a is disposed on first end surface 12e of multilayer body 12 and extends from first end surface 12e to partially cover each of first main surface 12a, second main surface 12b, first side surface 12c, and second side surface 12d. In this case, first external electrode 26a is electrically connected to first extending electrode portion 20a of first internal electrode layer 16a. First external electrode 26a may be provided only on first end surface 12e of multilayer body 12.

Second external electrode 26b is disposed on second end surface 12f of multilayer body 12, and extends from second end surface 12f to partially cover each of first main surface 12a, second main surface 12b, first side surface 12c, and second side surface 12d. In this case, second external electrode 26b is electrically connected to second extending electrode portion 20b of second internal electrode layer 16b. Second external electrode 26b may be provided only on second end surface 12f of multilayer body 12.

On the inside of multilayer body 12, first facing electrode portion 18a of first internal electrode layer 16a and second facing electrode portion 18b of second internal electrode layer 16b face each other with ceramic layer 14 interposed therebetween, thus generating a capacitance. Thus, a capacitance can be obtained between first external electrode 26a to which first internal electrode layer 16a is connected and second external electrode 26b to which second internal electrode layer 16b is connected, thus having a characteristic of a capacitor.

Figure 7A:
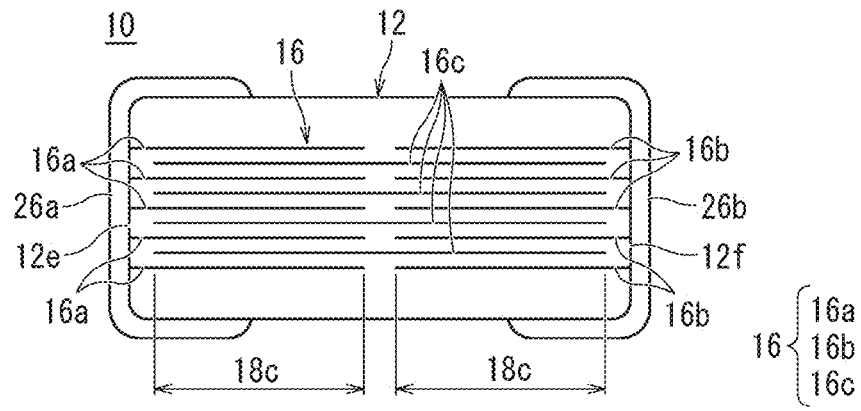
FIG. 7A is a cross-sectional view, which is taken along line II-II in FIG. 1, showing a structure in which a facing electrode portion of an internal electrode layer of a multilayer ceramic capacitor according to a preferred embodiment of the present invention is divided into two sections.
Figure 7B:
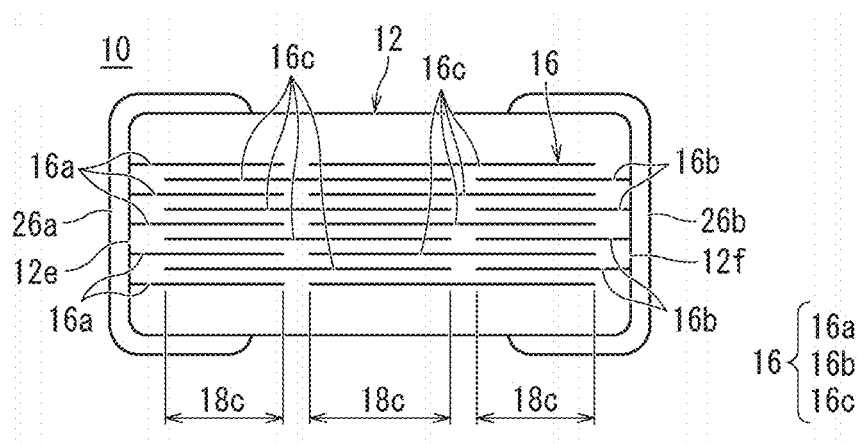
FIG. 7B is a cross-sectional view, which is taken along line II-II in FIG. 1, showing a structure in which a facing electrode portion of an internal electrode layer of a multilayer ceramic capacitor according to a preferred embodiment of the present invention is divided into three sections.
Figure 7C:
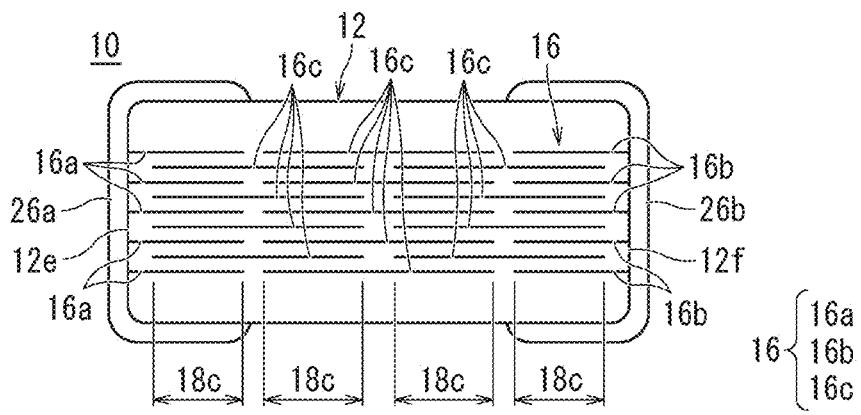
FIG. 7C is a cross-sectional view, which is taken along line II-II in FIG. 1, showing a structure in which a facing electrode portion of an internal electrode layer of a multilayer ceramic capacitor according to a preferred embodiment of the present invention is divided into four sections.

As internal electrode layer 16, floating internal electrode layers 16c not extending to either of first end surface 12e and second end surface 12f may be provided in addition to first internal electrode layer 16a and second internal electrode layer 16b, as shown in FIGS. 7A to 7C, thus providing a structure in which facing electrode portion 18c is divided into a plurality of sections by floating internal electrode layers 16c. Examples of the structure include a 2-stage structure as shown in FIG. 7A, a 3-stage structure as shown in FIG. 7B, a 4-stage structure as shown in FIG. 7C, and 5-or-more-stage structure. The structure including facing electrode portion 18c divided into a plurality of sections in this way enables to a configuration in which a plurality of capacitor components are provided between internal electrode layers 16a, 16b, and 16c facing each other and these capacitor components are connected in series. Thus, a relatively low voltage is applied to each capacitor component, so that the multilayer ceramic capacitor can have an increased breakdown voltage.

External electrode 26 includes an underlying electrode layer 28 disposed on the surface of multilayer body 12, and a plating layer 30 covering underlying electrode layer 28.

Underlying electrode layer 28 includes a first underlying electrode layer 28a and a second underlying electrode layer 28b.

First underlying electrode layer 28a is disposed on first end surface 12e of multilayer body 12, and extends from first end surface 12e to partially cover each of first main surface 12a, second main surface 12b, first side surface 12c, and second side surface 12d.

Second underlying electrode layer 28b is disposed on second end surface 12f of multilayer body 12, and extends from second end surface 12f to partially cover each of first main surface 12a, second main surface 12b, first side surface 12c, and second side surface 12d.

First underlying electrode layer 28a may be disposed only on first end surface 12e of multilayer body 12, and second underlying electrode layer 28b may be disposed only on second end surface 12f of multilayer body 12.

It is preferable that first underlying electrode layer 28a located on first end surface 12e and second underlying electrode layer 28b located on second end surface 12f each are, for example, about 3 µm or more and about 160 µm or less in thickness in a center portion in the stacking direction.

When underlying electrode layer 28 is provided on each of first main surface 12a, second main surface 12b, first side surface 12c, and second side surface 12d, a thickness is preferably, for example, about 3 µm or more and about 40 µm or less in the center portion in length direction z in each of first underlying electrode layer 28a and second underlying electrode layer 28b that are located on each of first main surface 12a, second main surface 12b, first side surface 12c, and second side surface 12d.

Underlying electrode layer 28 (first underlying electrode layer 28a and second underlying electrode layer 28b) contains Ni as the first metal component, Sn as the second metal component, and ceramic particles (a ceramic material). Underlying electrode layer 28 also includes a portion provided by alloying Ni as the first metal component and Sn as the second metal component. Thus, Ni as the first metal component and Sn as the second metal component in underlying electrode layer 28 are partially alloyed to lower the melting point. Accordingly, the sinterability of underlying electrode layer 28 can be improved, and the reaction of the alloy in underlying electrode layer 28 is activated. Thus, densification of underlying electrode layer 28 progresses. As a result, formation of gaps that may occur inside underlying electrode layer 28 can be reduced or prevented. In view of the above, multilayer ceramic capacitor 10 enables reduction or prevention of formation of gaps through which moisture infiltrates during formation of a plating layer and the like. Thus, moisture does not infiltrate into each external electrode, and also, moisture can be prevented from infiltrating into multilayer body 12, with the result that insulation deterioration can be prevented.

In this case, it is preferable that Ni as the first metal component is a main component, and Sn as the second metal component is a sub-component.

Also as shown in FIG. 3, ceramic particles (ceramic material) 38 randomly exist in first underlying electrode layer 28a and second underlying electrode layer 28b, each of which is made of Ni. Also, an alloy portion 40 is provided that is formed by alloying Ni as the first metal component and Sn as the second metal component so as to surround each of ceramic particles 38.

Alloy portion 40 in underlying electrode layer 28 is checked by the following method. Specifically, plating layer 30 of multilayer ceramic capacitor 10 is first peeled off to expose underlying electrode layer 28. Then, XRD analysis is conducted on the end surface of the exposed underlying electrode layer 28 to extract only peaks of Ni. Thus, it can be checked that the peak position of Ni in the portion containing Sn is shifted to the low angle side with respect to the portion not containing Sn, and thus, it can be determined that Ni is partially alloyed.

Also, the alloy portion 40 may exist entirely around ceramic particle 38 or may exist on only a portion of ceramic particle 38.

Furthermore, ceramic particles 38 may be partially in contact with each other with alloy portion 40 interposed therebetween, or may be space apart and contacting each other.

Also at the interface between underlying electrode layer 28 and multilayer body 12, an end surface alloy layer 42 is provided that is formed by alloying Ni as the first metal component and Sn as the second metal component contained in underlying electrode layer 28, or by alloying Ni as the third metal component contained in internal electrode layer 16 and Sn as the second metal component contained in underlying electrode layer 28.

End surface alloy layer 42 includes a first end surface alloy layer 42a and a second end surface alloy layer 42b. First end surface alloy layer 42a is disposed at the interface between first end surface 12e of multilayer body 12 and first underlying electrode layer 28a. Second end surface alloy layer 42b is disposed at the interface between second end surface 12f of multilayer body 12 and second underlying electrode layer 28b.

When Sn as the fourth metal component is added to internal electrode layer 16, Ni as the third metal component of internal electrode layer 16 may be alloyed with Sn as the fourth metal component. In other words, at the interface between underlying electrode layer 28 and multilayer body 12, end surface alloy layer 42 may be provided that is made of the first metal component to the fourth metal component contained in each of internal electrode layer 16 and underlying electrode layer 28.

First end surface alloy layer 42a disposed at the interface between first underlying electrode layer 28a and multilayer body 12 may be disposed at the entire interface between first underlying electrode layer 28a and multilayer body 12, or may be disposed at a portion of the interface between first underlying electrode layer 28a and multilayer body 12. Furthermore, second end surface alloy layer 42b disposed at the interface between second underlying electrode layer 28b and multilayer body 12 may be disposed at the entire interface between second underlying electrode layer 28b and multilayer body 12, or may be disposed at a portion of the interface between second underlying electrode layer 28b and multilayer body 12.

Thus, since end surface alloy layer 42 is disposed at the interface between underlying electrode layer 28 and multilayer body 12 in this way, the melting point at and around each of both end surfaces of multilayer body 12 can be lowered. Consequently, the sinterability of ceramic layer 14 located near each the end surfaces of the multilayer body 12 can be more effectively improved.

As to the amounts of Ni as the first metal component, Sn as the second metal component, and ceramic particles (a ceramic material) contained in underlying electrode layer 28, for example, assuming that the sum of Ni as the first metal component and Sn as the second metal component is 100 mol, the content of Sn is preferably about 0.001 mol or more and about 0.1 mol or less, and the content of the ceramic particles (a ceramic material) is preferably about 5% or more and about 50% or less with respect to the entire volume of underlying electrode layer 28.

It is preferable that the dielectric material as a ceramic material contained in underlying electrode layer 28 includes at least one selected from $BaTiO_3$, $CaTiO_3$, $SrTiO_3$, or $CaZrO_3$, for example. Since the dielectric material is contained as a coexisting material in underlying electrode layer 28, the dielectric material contained in underlying electrode layer 28 reacts with ceramic layer 14 in each of first outer layer portion 15b and second outer layer portion 15c of multilayer body 12, to thus achieve an anchor effect. Consequently, the adhesive force between underlying electrode layer 28 and multilayer body 12 is improved.

When piezoelectric ceramic is used for multilayer body 12, examples of the piezoelectric ceramic material as a ceramic material contained in underlying electrode layer 28 may be a PZT (lead zirconate titanate)-based ceramic material and the like.

When semiconductor ceramic is used for multilayer body 12, examples of the semiconductor ceramic material as a ceramic material contained in underlying electrode layer 28 may be a spinel-based ceramic material, and the like.

When magnetic ceramic is used for multilayer body 12, examples of the magnetic ceramic material as a ceramic material contained in underlying electrode layer 28 may be a ferrite ceramic material and the like.

Plating layer 30 includes a first plating layer 30a and a second plating layer 30b.

First plating layer 30a is disposed to cover first underlying electrode layer 28a.

Second plating layer 30b is disposed to cover second underlying electrode layer 28b.

Plating layer 30 preferably contains at least one selected, for example, from Cu, Ni, Sn, Ag, Pd, an Ag—Pd alloy, Au, and the like.

Plating layer 30 may include a plurality of layers.

Preferably, plating layer 30 includes a lower plating layer 32 covering underlying electrode layer 28, an intermediate plating layer 34 covering lower plating layer 32; and an upper plating layer 36 covering intermediate plating layer 34.

The thickness of one plating layer is preferably about 1 μm or more and about 15 μm or less, for example.

Lower plating layer 32 includes a first lower plating layer 32a and a second lower plating layer 32b.

First lower plating layer 32a covers first underlying electrode layer 28a. Specifically, it is preferable that first lower plating layer 32a is disposed on the surface of first underlying electrode layer 28a that is located on first end surface 12e, so as to also extend to the surface of first underlying electrode layer 28a that is located on first main surface 12a, second main surface 12b, first side surface 12c, and second side surface 12d. First lower plating layer 32a may be disposed only on the surface of first underlying electrode layer 28a disposed on first end surface 12e.

Second lower plating layer 32b to covers second underlying electrode layer 28b. Specifically, it is preferable that second lower plating layer 32b is disposed on the surface of second underlying electrode layer 28b that is located on second end surface 12f, so as to also extend to the surface of second underlying electrode layer 28b that is located on first main surface 12a, second main surface 12b, first side surface 12c, and second side surface 12d. Second lower plating layer 32b may be disposed only on the surface of second underlying electrode layer 28b disposed on second end surface 12f.

In the present preferred embodiment, lower plating layer 32 is preferably defined by a Cu plating layer, for example. Lower plating layer 32 is defined by a Cu plating layer and covers the surface of underlying electrode layer 28, thus achieving an effect of reducing or preventing infiltration of a plating solution.

The stress of the Cu plating layer applied to the multilayer body is preferably about −400 MPa or more and about −3 MPa or less, for example. Thus, the compressive stress of the Cu plating layer may reduce the tensile stress to be applied to the end portion of underlying electrode layer 28 after multilayer ceramic capacitor 10 is mounted on a mounting substrate, with the result that the effect of improving the mechanical strength is achieved.

Intermediate plating layer 34 includes a first intermediate plating layer 34a and a second intermediate plating layer 34b.

First intermediate plating layer 34a covers first lower plating layer 32a. Specifically, it is preferable that first intermediate plating layer 34a is disposed on the surface of first lower plating layer 32a that is located on first end surface 12e so as to also extend to the surface of first lower plating layer 32a that is located on first main surface 12a, second main surface 12b, first side surface 12c, and second side surface 12d. First intermediate plating layer 34a may be disposed only on the surface of first lower plating layer 32a disposed on first end surface 12e.

Second intermediate plating layer 34b covers second lower plating layer 32b. Specifically, it is preferable that second intermediate plating layer 34b is disposed on the surface of second lower plating layer 32b that is located on second end surface 12f so as to also extend to the surface of second lower plating layer 32b that is located on first main surface 12a, second main surface 12b, first side surface 12c, and second side surface 12d. It should be noted that second intermediate plating layer 34b may be disposed only on the surface of second lower plating layer 32b disposed on second end surface 12f.

In the present preferred embodiment, intermediate plating layer 34 is preferably defined by an Ni plating layer, for example. Intermediate plating layer 34 is defined an Ni plating layer and covers the surface of lower plating layer 32. As a result, underlying electrode layer 28 can be prevented from being eroded by solder used when multilayer ceramic capacitor 10 is mounted on a mounting substrate.

Upper plating layer 36 includes a first upper plating layer 36a and a second upper plating layer 36b.

First upper plating layer 36a covers first intermediate plating layer 34a. Specifically, it is preferable that first upper plating layer 36a is disposed on the surface of first intermediate plating layer 34a that is located on first end surface 12e, so as to also extend to the surface of first intermediate plating layer 34a that is located on first main surface 12a, second main surface 12b, first side surface 12c, and second side surface 12d. First upper plating layer 36a may be disposed only on the surface of first intermediate plating layer 34a disposed on first end surface 12e.

Second upper plating layer 36b covers second intermediate plating layer 34b. Specifically, it is preferable that second upper plating layer 36b is disposed on the surface of second intermediate plating layer 34b that is located on second end surface 12f, so as to also extend to the surface of second intermediate plating layer 34b that is located on first main surface 12a, second main surface 12b, first side surface 12c, and second side surface 12d. Second upper plating layer 36b may be disposed only on the surface of second intermediate plating layer 34b disposed on second end surface 12f.

In the present preferred embodiment, upper plating layer 36 is preferably defined by an Sn plating layer, for example. Upper plating layer 36 is defined by an Sn plating layer and covers the surface of intermediate plating layer 34, to thus improve the wettability of solder used when multilayer ceramic capacitor 10 is mounted on a mounting substrate, with the result that multilayer ceramic capacitor 10 can be readily mounted.

In external electrode 26 according to the present preferred embodiment, plating layer 30 includes three layers including lower plating layer 32, intermediate plating layer 34, and upper plating layer 36, but the present invention is not limited thereto, and may include only lower plating layer 32, may include only of intermediate plating layer 34, or may include only of upper plating layer 36.

In addition, multilayer ceramic capacitor 10 including multilayer body 12, first external electrode 26a, and second external electrode 26b has a dimension in length direction Z defined as an L dimension, a dimension in height direction X defined as a T dimension, and a dimension in width direction y defined as a W dimension.

As to the dimensions of multilayer ceramic capacitor 10, it is preferable that the L dimension in length direction z is about 0.20 mm or more and about 10.0 mm or less, the W dimension in width direction y is about 0.10 mm or more and about 10.0 mm or less, and the T dimension in height direction x is about 0.10 mm or more and about 5.0 mm or less, for example.

In multilayer ceramic capacitor 10 shown in FIG. 1, underlying electrode layer 28 contains Ni as the first metal component, Sn as the second metal component, and ceramic particles (a ceramic material). Thus, by containing Ni as the first metal component and Sn as the second metal component in this way, Ni as the first metal component and Sn as the second metal component in underlying electrode layer 28 are partially alloyed to lower the melting point. Accordingly, the sinterability of underlying electrode layer 28 can be improved to thus activate the reaction of the alloy in underlying electrode layer 28, and thus, densification of external electrode 26 progresses. As a result, formation of gaps that may occur in underlying electrode layer 28 can be reduced or prevented.

Therefore, multilayer ceramic capacitor 10 shown in FIG. 1 enables reduction or prevention of occurrence of gaps through which moisture infiltrates during formation of a plating layer or the like. Accordingly, moisture does not infiltrate into each external electrode, and thus, moisture can be prevented from infiltrating also into multilayer body 12, so that insulation deterioration can be prevented. As a result, multilayer ceramic capacitor 10 can be improved in reliability.

Second Preferred Embodiment

In the following, a multilayer ceramic capacitor will be described as an example of a multilayer ceramic electronic component according to a second preferred embodiment of the present invention. The multilayer ceramic capacitor according to the present second preferred embodiment is a three-terminal multilayer ceramic capacitor.

Figure 8:
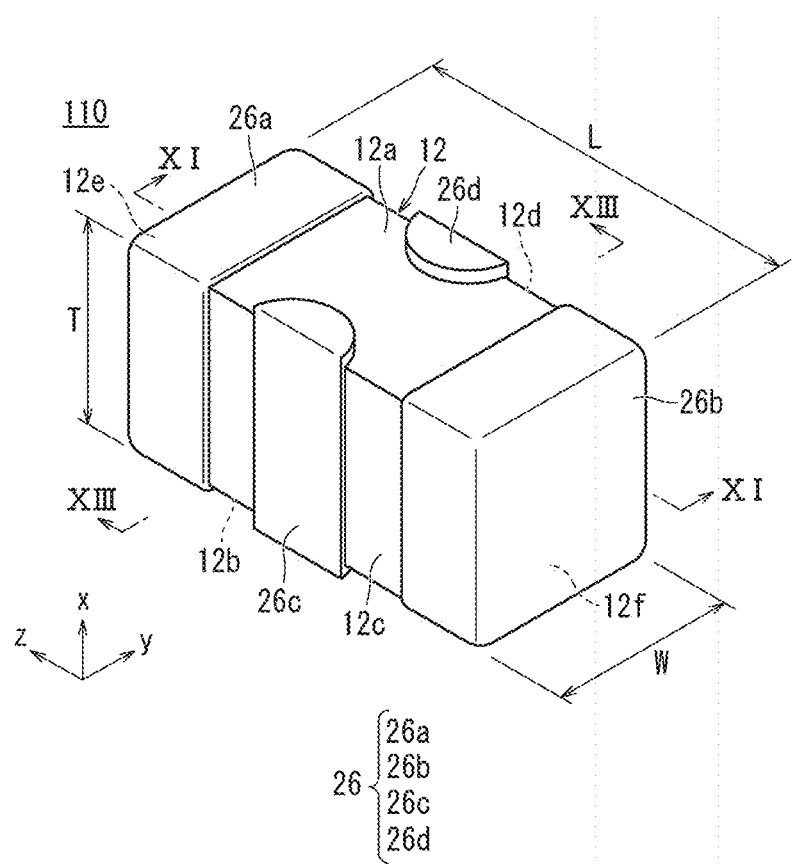
FIG. 8 is an external perspective view showing an example of a multilayer ceramic capacitor (a three-terminal multilayer ceramic capacitor) according to a second preferred embodiment of the present invention.
Figure 9:
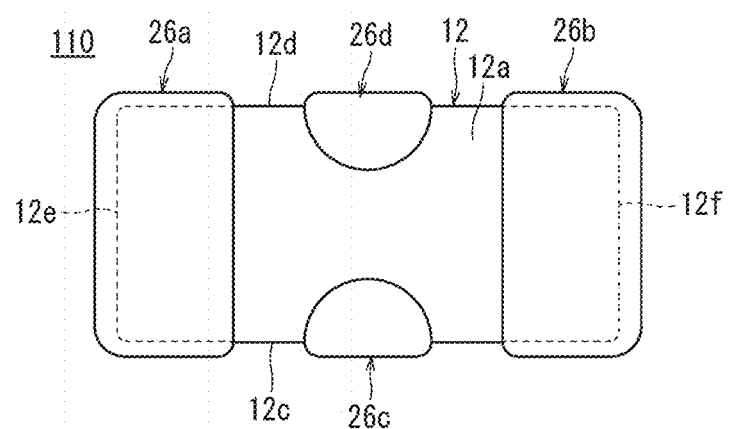
FIG. 9 is a top view showing an example of the multilayer ceramic capacitor (a three-terminal multilayer ceramic capacitor) according to the second preferred embodiment of the present invention.
Figure 10:
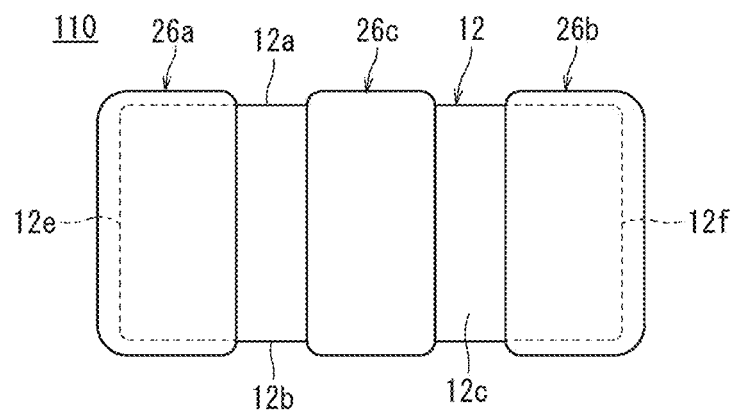
FIG. 10 is a side view showing an example of the multilayer ceramic capacitor (a three-terminal multilayer ceramic capacitor) according to the second preferred embodiment of the present invention.
Figure 11:
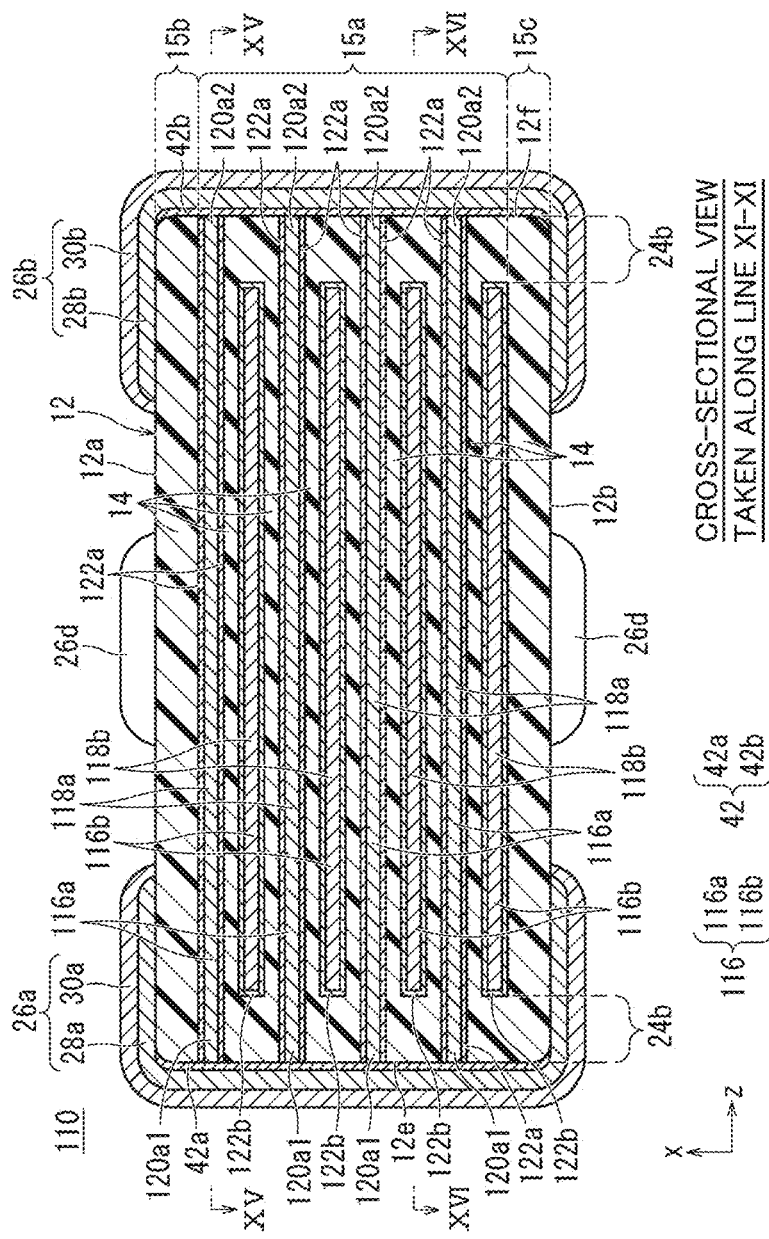
FIG. 11 is a cross-sectional view taken along a line XI-XI in FIG. 8.
Figure 12:
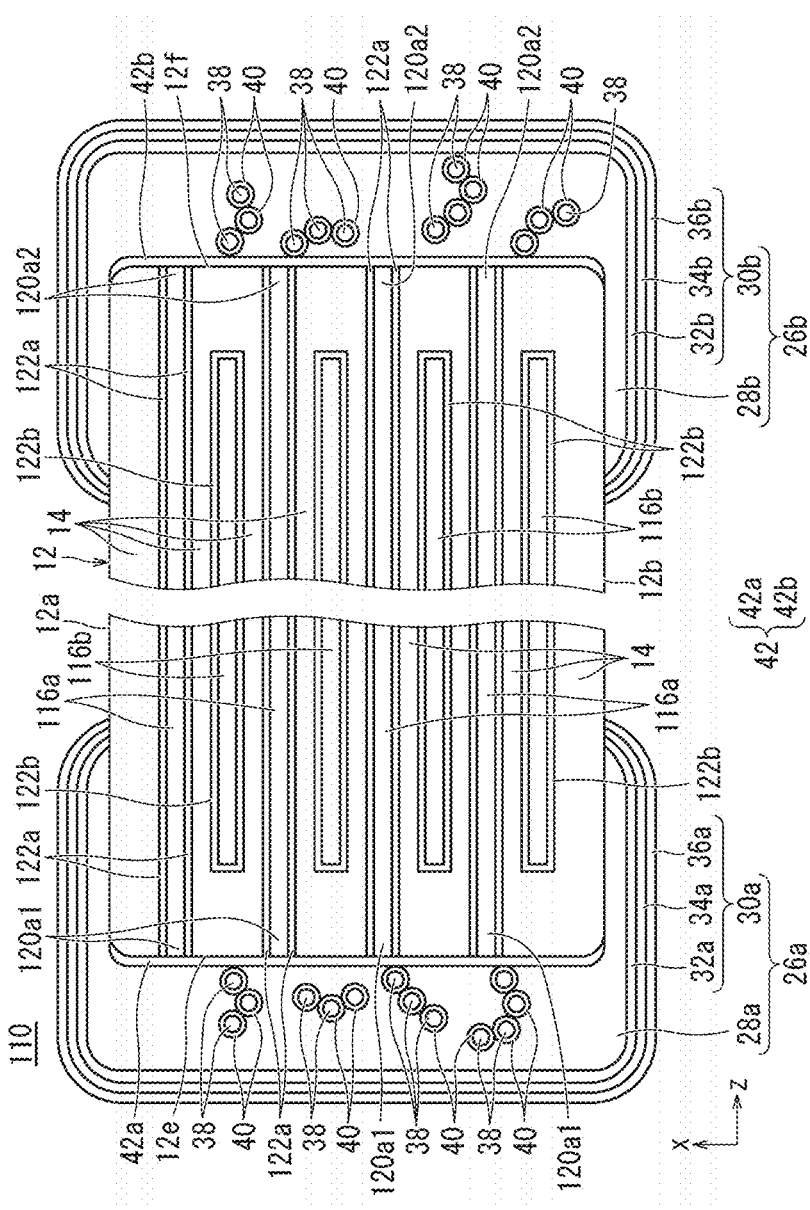
FIG. 12 is a schematic cross-sectional view of external electrodes located on both end surfaces in FIG. 11 and regions therearound in an enlarged manner.
Figure 13:
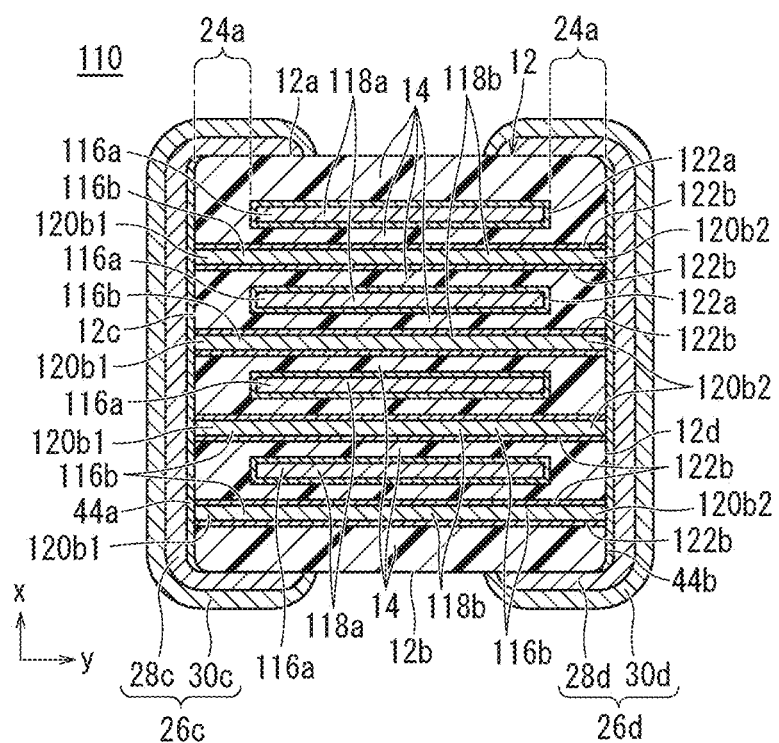
FIG. 13 is a cross-sectional view taken along a line XIII-XIII in FIG. 8.
Figure 14:
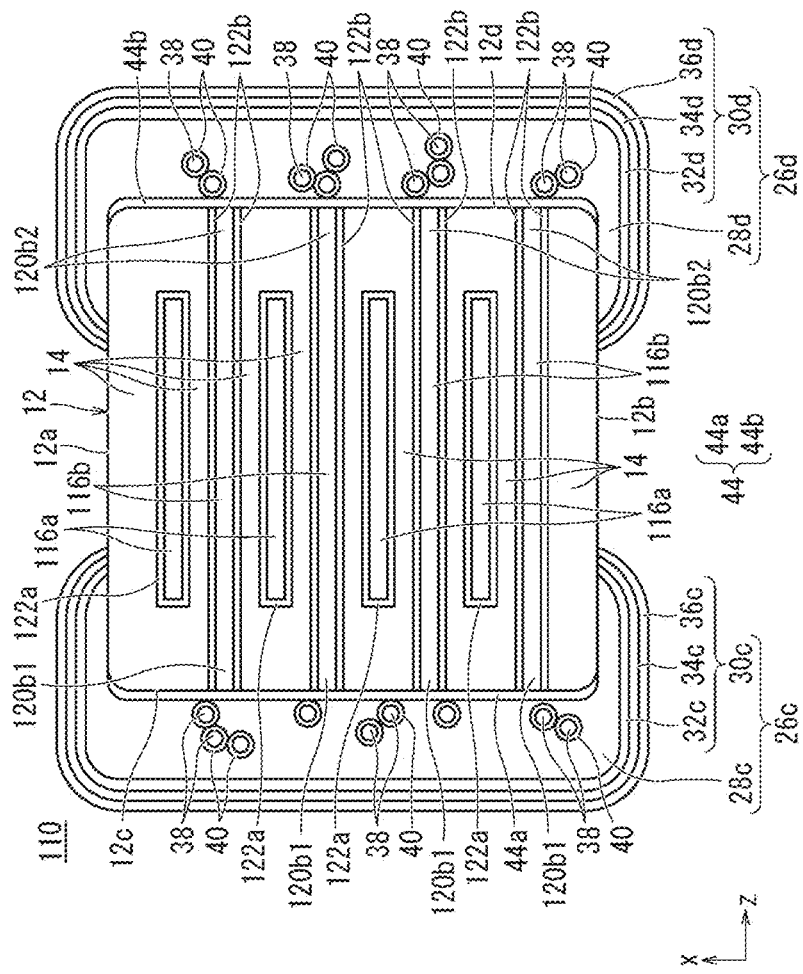
FIG. 14 is a schematic cross-sectional view of external electrodes located on both side surfaces in FIG. 13 and regions therearound in an enlarged manner.
Figure 15:
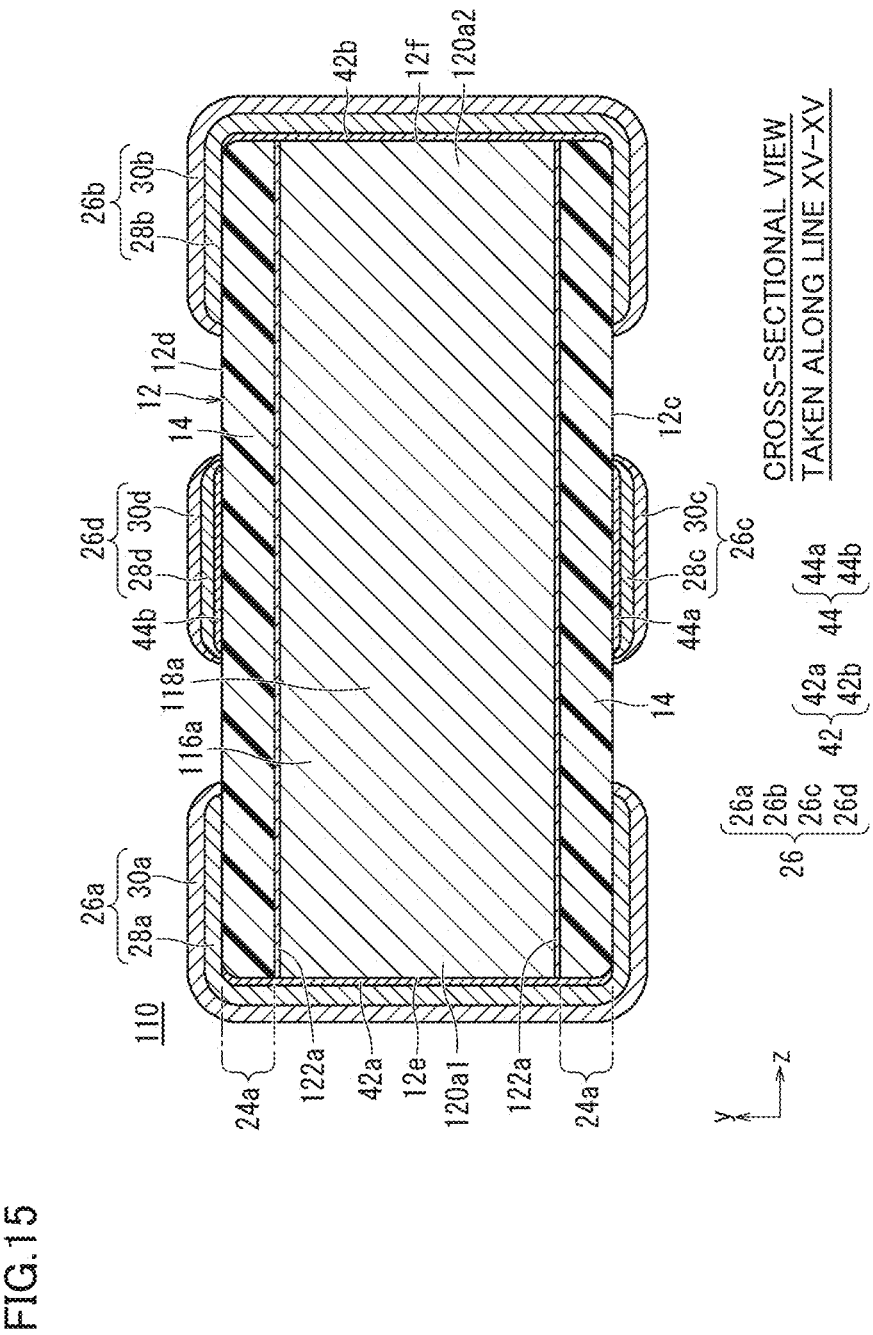
FIG. 15 is a cross-sectional view taken along a line XV-XV in FIG. 11.
Figure 16:
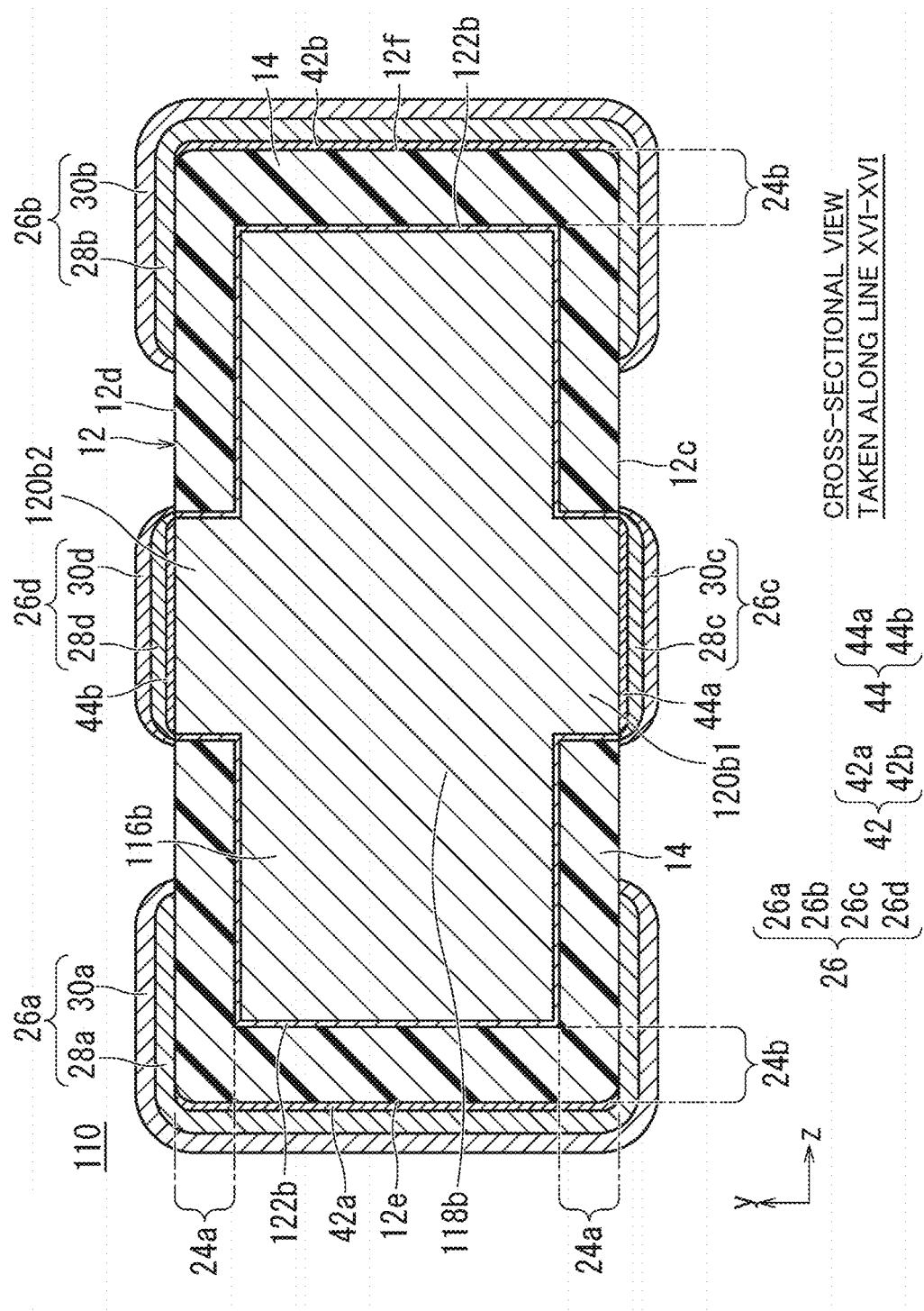
FIG. 16 is a cross-sectional view taken along a line XVI-XVI in FIG. 11.

Referring to FIG. 8, a multilayer ceramic capacitor (a three-terminal multilayer ceramic capacitor) will be described as an example of the multilayer ceramic electronic component according to the second preferred embodiment of the present invention. FIG. 8 is an external perspective view showing an example of a multilayer ceramic capacitor (a three-terminal multilayer ceramic capacitor) according to the second preferred embodiment of the present invention. FIG. 9 is a top view showing an example of the multilayer ceramic capacitor (a three-terminal multilayer ceramic capacitor) according to the second preferred embodiment of the present invention. FIG. 10 is a side view showing an example of the multilayer ceramic capacitor (a three-terminal multilayer ceramic capacitor) according to the second preferred embodiment of the present invention. FIG. 11 is a cross-sectional view taken along a line XI-XI in FIG. 8. FIG. 12 is a schematic cross-sectional view of external electrodes located on both end surfaces in FIG. 11 and regions therearound in an enlarged manner. FIG. 13 is a cross-sectional view taken along a line XIII-XIII in FIG. 8. FIG. 14 is a schematic cross-sectional view of external electrodes located on both side surfaces in FIG. 13 and regions therearound in an enlarged manner. FIG. 15 is a cross-sectional view taken along a line XV-XV in FIG. 11. FIG. 16 is a cross-sectional view taken along a line XVI-XVI in FIG. 11.

As shown in FIGS. 8 to 13, a multilayer ceramic capacitor 110 includes a multilayer body 12 having a rectangular or substantially rectangular parallelepiped shape, for example.

Multilayer body 12 includes a plurality of stacked ceramic layers 14 and a plurality of internal electrode layers 116. Multilayer body 12 also includes a first main surface 12a and a second main surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y. This multilayer body 12 includes corner portions and ridge portions, each of which is preferably rounded. In this case, the corner portion corresponds to a portion at which three adjoining planes of the multilayer body cross each other. The ridge portion corresponds to a portion at which two adjoining planes of the multilayer body cross each other. Furthermore, first main surface 12a, second main surface 12b, first side surface 12c, second side surface 12d, first end surface 12e, and second end surface 12f each may be partially or entirely provided with, for example, projections and recesses, and the like. The dimension of multilayer body 12 in length direction z is not necessarily longer than the dimension of multilayer body 12 in width direction y.

In the stacking direction extending along a line connecting first main surface 12a and second main surface 12b, multilayer body 12 includes an effective layer portion 15a in which internal electrode layers 116 face each other, a first outer layer portion 15b located between first main surface 12a and one of internal electrode layers 116 that is closest to first main surface 12a, and a second outer layer portion 15c located between second main surface 12b and one of internal electrode layers 116 that is closest to second main surface 12b.

First outer layer portion 15b includes a plurality of ceramic layers 14 that are located on the first main surface 12a side of multilayer body 12 and also located between first main surface 12a and one of internal electrode layers 116 that is closest to first main surface 12a.

Second outer layer portion 15c includes a plurality of ceramic layers 14 that are located on the second main surface 12b side of multilayer body 12 and also located between second main surface 12b and one of internal electrode layers 116 that is closest to second main surface 12b.

A region sandwiched between first outer layer portion 15b and second outer layer portion 15c is effective layer portion 15a.

Since ceramic layer 14 is made of the same or substantially the same material as that of multilayer ceramic capacitor 10, the description thereof will not be repeated.

Also, since the average thickness of the fired ceramic layers 14 in the stacking direction is the same or substantially the same as that of multilayer ceramic capacitor 10, the description thereof will not be repeated.

Multilayer body 12 includes, as a plurality of internal electrode layers 116, a plurality of first internal electrode layers 116a and a plurality of second internal electrode layers 116b. The plurality of first internal electrode layers 116a and the plurality of second internal electrode layers 116b are buried so as to be alternately arranged at regular intervals in the stacking direction of multilayer body 12.

As shown in FIG. 15, first internal electrode layer 116a includes a first facing electrode portion 118a that faces second internal electrode layer 116b, one first extending electrode portion 120a1 extending from first facing electrode portion 118a to first end surface 12e of multilayer body 12, and the other second extending electrode portion 120a2 extending from first facing electrode portion 118a to second end surface 12f of multilayer body 12. Specifically, one first extending electrode portion 120a1 is exposed on first end surface 12e of multilayer body 12 while the other first extending electrode portion 120a2 is exposed on second end surface 12f of multilayer body 12. Thus, first internal electrode layer 116a is not exposed on first side surface 12c and second side surface 12d of multilayer body 12.

As shown in FIG. 16, second internal electrode layer 116b has an approximately cross shape, and includes a second facing electrode portion 118b that faces first internal electrode layer 116a, one second extending electrode portion 120b1 extending from second facing electrode portion 118b to first side surface 12c of multilayer body 12, and the other second extending electrode portion 120b2 extending from second facing electrode portion 118b to second side surface 12d of multilayer body 12. Specifically, one second extending electrode portion 120b1 is exposed on first side surface 12c of multilayer body 12 while the other second extending electrode portion 120b2 is exposed on second side surface 12d of multilayer body 12. Thus, second internal electrode layer 116b is not exposed on first end surface 12e and second end surface 12f of multilayer body 12.

Four corner portions of second facing electrode portion 118b in second internal electrode layer 116b are not chamfered, but may be chamfered. This can prevent overlapping between the four corner portions of second facing electrode portion 118b and the corner portions of first facing electrode portion 118a in first internal electrode layer 116a, and thus, any electric field concentration can be reduced or prevented. As a result, any electric breakdown in the ceramic capacitor that may be caused by electric field concentration can be reduced or prevented.

Furthermore, multilayer body 12 includes a side portion (hereinafter also referred to as a "W gap") 24a provided between first side surface 12c and one end of first facing electrode portion 118a of first internal electrode layer 116a in width direction y, and between second side surface 12d and the other end of first facing electrode portion 118a of first internal electrode layer 116a in width direction y, and also includes side portion 24a provided between first side surface 12c and one end of second facing electrode portion 118b of second internal electrode layer 116b in width direction y, and between second side surface 12d and the other end of first facing electrode portion 118a of second internal electrode layer 116b in width direction y. Furthermore, multilayer body 12 includes an end portion (hereinafter also referred to as an "L gap") 24b provided between first end surface 12e and one end of second internal electrode layer 116b in length direction z, and between second end surface 12f and the other end of second internal electrode layer 116b in length direction z.

It is preferable that internal electrode layer 116 contains Ni as the third metal component and Sn as the fourth metal component. Also, Ni as the third metal component and Sn as the third metal component may be partially alloyed. Thus, alloying of Ni and Sn changes the state (an electrical barrier height) at and around the interface of internal electrode layer 116 with ceramic layer 14, thus contributing to an improvement in high-temperature load life. As a result, multilayer ceramic capacitor 10 having excellent reliability (improved in high-temperature load life) during voltage application is obtained.

In this case, it is preferable that Ni as the third metal component is a main component and Sn as the fourth metal component is a sub-component.

In this case, assuming that the sum of Ni as the third metal component and Sn as the fourth metal component in internal electrode layer 116 is 100 mol, the content of Sn is preferably about 0.001 mol or more and about 0.1 mol or less, for example. Furthermore, the above-described state can be achieved by adding, to a paste for an internal electrode, Sn of the fourth metal component as a sub-component for Ni of the third metal component as a main component, or by adding an Ni—Sn alloy to the paste for an internal electrode.

Furthermore, it is preferable that a portion provided by alloying Ni as the third metal component and Sn as the fourth metal component includes an alloy layer 122 provided at an interface between ceramic layer 14 and internal electrode layer 116 so as to cover internal electrode layer 116. Alloy layer 122 includes a first alloy layer 122a and a second alloy layer 122b. First alloy layer 122a covers first internal electrode layer 116a while second alloy layer 122b covers second internal electrode layer 116b.

Figure 17:
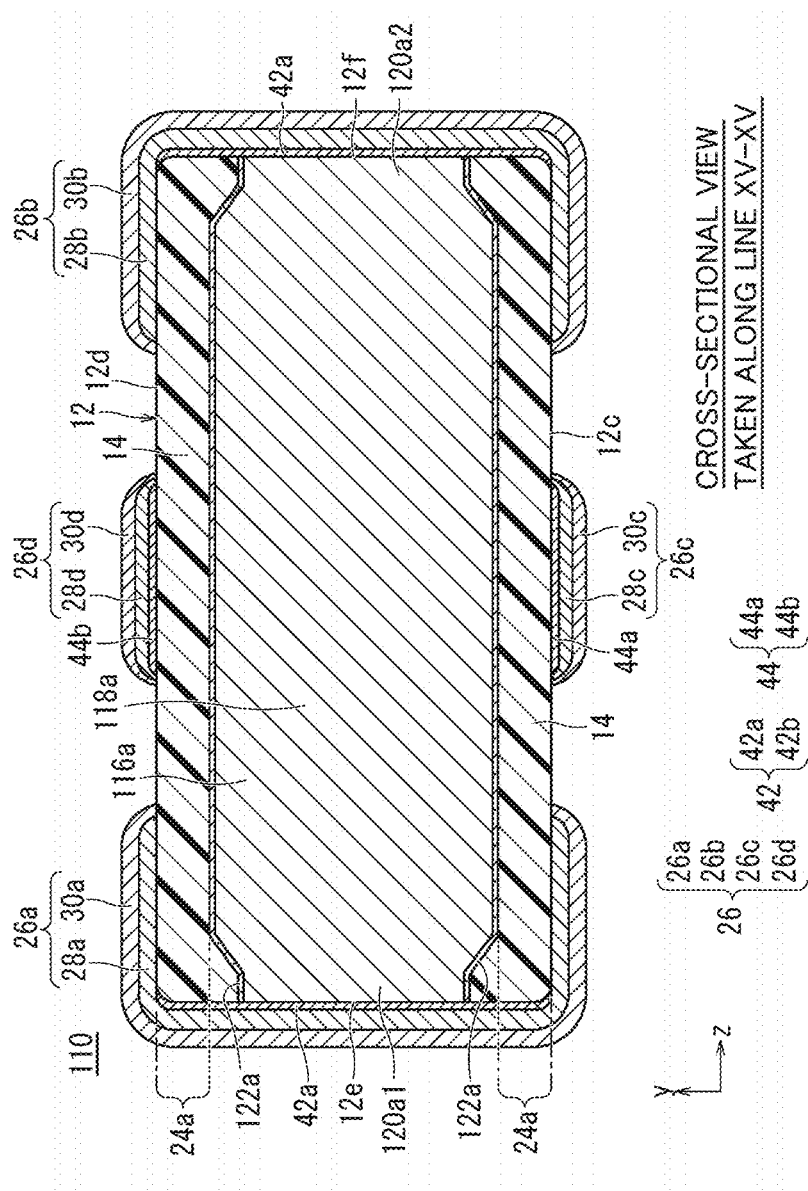
FIG. 17 shows a modification of a first internal electrode layer shown in FIG. 15.

As shown in FIG. 17, first internal electrode layer 116a may be provided such that the width of one first extending electrode portion 120a1 of first internal electrode layer 116a, which extends to first end surface 12e, tapers toward first end surface 12e, and such that the width of the other first extending electrode portion 120a2 of first internal electrode layer 116a, which extends to second end surface 12f, tapers toward second end surface 12f (a tapered shape). At the position where these widths taper, the plane of first facing electrode portion 118a of first internal electrode layer 116a and the plane of second facing electrode portion 118b of second internal electrode layer 116b, which face each other, are preferably ensured to have at least the same or substantially the same area.

Also, an external electrode 26 is disposed on each of the first end surface 12e side, the second end surface 12f side, the first side surface 12c side, and the second side surface 12d side of multilayer body 12. External electrode 26 includes a first external electrode 26a, a second external electrode 26b, a third external electrode 26c, and a fourth external electrode 26d.

First external electrode 26a is disposed on first end surface 12e of multilayer body 12. First external electrode 26a extends from first end surface 12e of multilayer body 12 so as to partially cover each of first main surface 12a, second main surface 12b, first side surface 12c, and second side surface 12d. First external electrode 26a is electrically connected to one first extending electrode portion 120a1 of first internal electrode layer 116 that is exposed on first end surface 12e of multilayer body 12.

Second external electrode 26b is disposed on second end surface 12f of multilayer body 12. Second external electrode 26b extends from second end surface 12f of multilayer body 12 so as to partially cover each of first main surface 12a, second main surface 12b, first side surface 12c, and second side surface 12d. Second external electrode 26b is electrically connected to the other first extending electrode portion 120a2 of first internal electrode layer 116 that is exposed on second end surface 12f of multilayer body 12.

Third external electrode 26c is disposed on first side surface 12c of multilayer body 12. Third external electrode 26c extends from first side surface 12c so as to partially cover each of first main surface 12a and second main surface 12b. Third external electrode 26c is electrically connected to one second extending electrode portion 120b1 of second internal electrode layer 116b that is exposed on first side surface 12c of multilayer body 12.

Fourth external electrode 26d is disposed on second side surface 12d of multilayer body 12. Fourth external electrode 26d extend from second side surface 12d so as to partially cover each of first main surface 12a and second main surface 12b. Fourth external electrode 26d is electrically connected to the other second extending electrode portion 120b2 of second internal electrode layer 116b that is exposed on second side surface 12d of multilayer body 12.

On the inside of multilayer body 12, first facing electrode portion 118a of first internal electrode layer 116a and second facing electrode portion 118b of second internal electrode layer 116b face each other with a ceramic layer 14 interposed therebetween, thus generating a capacitance. Thus, a capacitance can be obtained between first external electrode 26a and second external electrode 26b to which first internal electrode layer 116a is connected, and third external electrode 26c and fourth external electrode 26d to which second internal electrode layer 116b is connected, thus obtaining a characteristic of a capacitor.

External electrode 26 includes an underlying electrode layer 28 disposed on the surface of multilayer body 12, and a plating layer 30 covering underlying electrode layer 28.

Underlying electrode layer 28 includes a first underlying electrode layer 28a, a second underlying electrode layer 28b, a third underlying electrode layer 28c, and a fourth underlying electrode layer 28d.

First underlying electrode layer 28a is disposed on first end surface 12e of multilayer body 12 and extends from first end surface 12e so as to partially cover each of first main surface 12a, second main surface 12b, first side surface 12c, and second side surface 12d.

Second underlying electrode layer 28b is disposed on second end surface 12f of multilayer body 12 and extends from second end surface 12f so as to partially cover each of first main surface 12a, second main surface 12b, first side surface 12c, and second side surface 12d.

First underlying electrode layer 28a may be disposed only on first end surface 12e of multilayer body 12, and second underlying electrode layer 28b may be disposed only on second end surface 12f of multilayer body 12.

Third underlying electrode layer 28c is disposed on first side surface 12c of multilayer body 12 and extends from first side surface 12c so as to partially cover each of first main surface 12a and second main surface 12b.

Fourth underlying electrode layer 28d is disposed on second side surface 12d of multilayer body 12 and extends from second side surface 12d so as to partially cover each of first main surface 12a and second main surface 12b.

Third underlying electrode layer 28c may be disposed only on first side surface 12c of multilayer body 12, and fourth underlying electrode layer 28d may be disposed only on second side surface 12d of multilayer body 12.

Underlying electrode 28 layer (first underlying electrode layer 28a, second underlying electrode layer 28b, third underlying electrode layer 28c, and fourth underlying electrode layer 28d) contains Ni as the first metal component, Sn as the second metal component, and ceramic particles (a ceramic material). Underlying electrode layer 28 also includes a portion formed by alloying Ni as the first metal component and Sn as the second metal component. Thus, Ni as the first metal component and Sn as the second metal component in underlying electrode layer 28 are partially alloyed, to thus lower the melting point. Accordingly, the sinterability of underlying electrode layer 28 can be improved, the reaction of the alloy in underlying electrode layer 28 is activated, and thus, densification of underlying electrode layer 28 progresses. As a result, formation of gaps that may occur in underlying electrode layer 28 can be reduced or prevented. In view of the above, multilayer ceramic capacitor 10 enables reduction or prevention of formation of gaps through which moisture infiltrates during formation of a plating layer or the like. Thus, moisture does not infiltrate into each external electrode, and also, moisture can be prevented from infiltrating also into multilayer body 12, with the result that insulation deterioration can be prevented.

In this case, it is preferable that Ni as the first metal component is a main component while Sn as the second metal component is a sub-component.

As shown in FIG. 12, ceramic particles (a ceramic material) 38 randomly exist in first underlying electrode layer 28a and second underlying electrode layer 28b, each of which is made of Ni, and each include an alloy portion 40 formed by alloying Ni as the first metal component and Sn as the second metal component such that each alloy portion 40 surrounds corresponding ceramic particle 38.

Similarly, as shown in FIG. 14, ceramic particles 38 randomly exist in third underlying electrode layer 28c and fourth underlying electrode layer 28d, each of which is made of Ni, and each include alloy portion 40 formed by alloying Ni as the first metal component and Sn as the second metal component such that each alloy portion 40 surrounds corresponding ceramic particle 38.

Also, the alloy portion 40 may exist entirely around ceramic particle 38 or may exist on only a portion of ceramic particle 38.

Furthermore, ceramic particles 38 may be partially in contact with each other with alloy portion 40 interposed therebetween, or may be spaced apart without contacting each other.

Also at the interface between underlying electrode layer 28 and multilayer body 12, an end surface alloy layer 42 and a side surface alloy layer 44 are provided, each of which is formed by alloying Ni as the first metal component and Sn as the second metal component contained in underlying electrode layer 28, or by alloying Ni as the third metal component contained in internal electrode layer 16 and Sn as the second metal component contained in underlying electrode layer 28.

End surface alloy layer 42 includes a first end surface alloy layer 42a and a second end surface alloy layer 42b. First end surface alloy layer 42a is disposed at the interface between first end surface 12e of multilayer body 12 and first underlying electrode layer 28a. Second end surface alloy layer 42b is disposed at the interface between second end surface 12f of multilayer body 12 and second underlying electrode layer 28b.

Side surface alloy layer 44 includes a first side surface alloy layer 44a and a second side surface alloy layer 44b. First side surface alloy layer 44a is disposed at the interface between first side surface 12c of multilayer body 12 and third underlying electrode layer 28c. Second side surface alloy layer 44b is disposed at the interface between second side surface 12d of multilayer body 12 and fourth underlying electrode layer 28d.

When Sn as the fourth metal component is added to internal electrode layer 116, Ni as the third metal component and Sn as the fourth metal component in internal electrode layer 116 may be alloyed. In other words, at the interface between underlying electrode layer 28 and multilayer body 12, end surface alloy layer 42 and side surface alloy layer 44 may be provided, each of which includes the first metal component to the fourth metal component contained in each of internal electrode layer 116 and underlying electrode layer 28.

First end surface alloy layer 42a disposed at the interface between first underlying electrode layer 28a and multilayer body 12 may be disposed at the entire interface between first underlying electrode layer 28a and multilayer body 12, or may be disposed at a portion of the interface between first underlying electrode layer 28a and multilayer body 12. Second end surface alloy layer 42b disposed at the interface between second underlying electrode layer 28b and multilayer body 12 may be disposed at the entire interface between second underlying electrode layer 28b and multilayer body 12, or may be disposed at a portion of the interface between second underlying electrode layer 28b and multilayer body 12.

Furthermore, first side surface alloy layer 44a disposed at the interface between third underlying electrode layer 28c and multilayer body 12 may be disposed at the entire interface between third underlying electrode layer 28c and multilayer body 12, or may be disposed at a portion of the interface between third underlying electrode layer 28c and multilayer body 12. Second side surface alloy layer 44b disposed at the interface between fourth underlying electrode layer 28d and multilayer body 12 may be disposed at the entire interface between fourth underlying electrode layer 28d and multilayer body 12, or may be disposed at a portion of the interface between fourth underlying electrode layer 28d and multilayer body 12.

Plating layer 30 includes a first plating layer 30a, a second plating layer 30b, a third plating layer 30c, and a fourth plating layer 30d.

First plating layer 30a is disposed to cover first underlying electrode layer 28a.

Second plating layer 30b is disposed to cover second underlying electrode layer 28b.

Third plating layer 30c is disposed to cover third underlying electrode layer 28c.

Fourth plating layer 30d is disposed to cover fourth underlying electrode layer 28d.

Plating layer 30 may include a plurality of layers.

Preferably, plating layer 30 includes a lower plating layer 32 covering underlying electrode layer 28, an intermediate plating layer 34 disposed to cover lower plating layer 32, and an upper plating layer 36 disposed to cover intermediate plating layer 34.

More specifically, first plating layer 30a includes a first lower plating layer 32a covering first underlying electrode layer 28a, a first intermediate plating layer 34a covering first lower plating layer 32a, and a first upper plating layer 36a covering first intermediate plating layer 34a.

Second plating layer 30b includes a second lower plating layer 32b covering second underlying electrode layer 28b, a second intermediate plating layer 34b covering second lower plating layer 32b, and a second upper plating layer 36b covering second intermediate plating layer 34b.

Third plating layer 30c includes a third lower plating layer 32c covering third underlying electrode layer 28c, a third intermediate plating layer 34c covering third lower plating layer 32c, and a third upper plating layer 36c covering third intermediate plating layer 34c.

Fourth plating layer 30d includes a fourth lower plating layer 32d covering fourth underlying electrode layer 28d, a fourth intermediate plating layer 34d covering fourth lower plating layer 32d, and a fourth upper plating layer 36d covering fourth intermediate plating layer 34d.

Since the material, the structure, and the like of plating layer 30 in multilayer ceramic capacitor 110 are the same or substantially the same as those of multilayer ceramic capacitor 10, the description thereof will not be repeated.

2. Method of Manufacturing Multilayer Ceramic Capacitor

A non-limiting example of a method of manufacturing a multilayer ceramic capacitor as a multilayer ceramic electronic component will be described. In the following, the method of manufacturing a multilayer ceramic capacitor according to the first preferred embodiment will be described.

First, a ceramic paste containing ceramic powder is applied in a sheet shape, for example, by screen printing or the like, and then dried to produce a ceramic green sheet.

Then, an electrically conductive paste for internal electrode formation is prepared and applied in a prescribed pattern on the ceramic green sheet, for example, by screen printing or gravure printing, thereby preparing a ceramic green sheet on which a conductive pattern for internal electrode formation is formed, and a ceramic green sheet on which no conductive pattern for internal electrode formation is formed.

In this case, when Sn as the fourth metal component of a sub-component for Ni as the third metal component of a main component is contained in the metal component of the internal electrode layer, Sn as the fourth metal component of a sub-component for Ni as the third metal component of a main component of the electrically conductive paste for internal electrode formation is added to the electrically conductive paste for internal electrode formation, or an Ni—Sn alloy is added to the electrically conductive paste for internal electrode formation. In this case, as to the addition amounts of Ni as the third metal component and Sn as the fourth metal component, the content of Sn is adjusted between about 0.001 mol or more and about 0.1 mol or less, for example, assuming that the sum of Ni as the third metal component and Sn as the fourth metal component is about 100 mol.

In addition, a ceramic paste and an electrically conductive paste for internal electrode formation may contain a known organic binder or a known organic solvent, for example.

Then, ceramic green sheets for outer layers are prepared, on which no conductive pattern for internal electrode formation is formed. Then, a prescribed number of these ceramic green sheets for outer layers are stacked, on which ceramic green sheets on which conductive patterns for internal electrode formation are formed are sequentially stacked, and further, a prescribed number of ceramic green sheets on which no conductive pattern for internal electrode formation is formed are stacked, to thus produce a mother multilayer body. In this case, a plurality of ceramic green sheets on which conductive patterns for internal electrode formation are printed are stacked such that extending portions of the conductive patterns for internal electrode formation extend alternately toward the opposite sides, thus producing a multilayer sheet.

Then, this multilayer sheet is press-fitted in the stacking direction by, for example, hydrostatic pressing or the like to thus produce a multilayer block.

Then, the multilayer block is cut into a prescribed shape and dimension so as to cut out a raw multilayer body chip. On this occasion, barrel polishing or the like, for example, may be provided to the raw multilayer body chip such that corner portions and ridge portions are rounded.

Then, underlying electrode layer 28 is formed. First, by methods such as dipping or screen printing, for example, both end surfaces of the raw multilayer body chip are applied with an electrically conductive paste for external electrode, which contains Ni as the first metal component, Sn as the second metal component, $BaTiO_3$ and the like as ceramic particles (a ceramic material), a solvent, a dispersing agent, and the like. In this case, the amounts of Ni as the first metal component, Sn as the second metal component, and $BaTiO_3$ and the like as ceramic particles (a ceramic material) that are contained in the electrically conductive paste for external electrode are adjusted such that the content of Sn is set at about 0.001 mol or more and about 0.1 mol or less, for example, assuming that the sum of Ni as the first metal component and Sn as the second metal component is 100 mol, and also such that the content of the ceramic material is set at about 5% or more and about 50% or less, for example, with respect to the entire volume of the underlying electrode layer.

Then, the raw multilayer body chip and the electrically conductive paste for external electrode applied to the raw multilayer body chip are simultaneously baked to thus form a multilayer body including a baked layer formed as an underlying electrode layer.

Then, a plating layer 30 is formed on the surface of the underlying electrode layer. In the multilayer ceramic capacitor shown in FIG. 1, the plating layer is formed to include a Cu plating layer as a lower plating layer, an Ni plating layer as an intermediate plating layer, and an Sn plating layer as an upper plating layer.

In the manner as described above, multilayer ceramic capacitor 10 shown in FIG. 1 is manufactured.

3. Experiment Examples

Then, a multilayer ceramic capacitor was manufactured to conduct a moisture resistance reliability test in order to check the advantageous effects of the above-described multilayer ceramic capacitor according to the present invention.

(1) Specifications of Samples in Examples

First, according to the above-described method of manufacturing a multilayer ceramic capacitor, multilayer ceramic capacitors according to Examples under the following specifications were produced.

Example 1

Structure of multilayer ceramic capacitor: two terminals (see FIG. 1)
Dimensions L×W×T of multilayer ceramic capacitor (including design values): about 1.0 mm×about 0.5 mm×about 0.5 mm
Materials of the dielectric layer: $BaTiO_3$
Capacitance: about 22 µF
Rated voltage: about 4V
Structure of internal electrode
Third metal component: Ni
Fourth metal component: none
Structure of external electrode
Underlying electrode layer
First metal component: Ni
Second metal component: Sn
Content of second metal component: Sn/(Ni+Sn)=about 0.005 mol
Ceramic material in underlying electrode layer: $BaTiO_3$
Content of ceramic material in underlying electrode layer: about 10%
Plating layer: a three-layer structure including a Cu plating layer, an Ni plating layer, and an Sn plating layer
Thickness of Cu plating layer: about 6 µm
Thickness of Ni plating layer: about 4 µm
Thickness of Sn plating layer: about 4 µm

Example 2

Structure of multilayer ceramic capacitor: three terminals (see FIG. 8)
Dimensions L×W×T of multilayer ceramic capacitor (including design values): about 1.0 mm×about 0.5 mm×about 0.5 mm
Material of dielectric layer: $BaTiO_3$
Capacitance: about 15 µF
Rated voltage: about 4V
Structure of internal electrode
Third metal component: Ni
Fourth metal component: none
Structure of external electrode
Underlying electrode layer
First metal component: Ni
Second metal component: Sn
Content of second metal component: Sn/(Ni+Sn)=about 0.005 mol
Ceramic material in underlying electrode layer: $BaTiO_3$
Content of ceramic material in underlying electrode layer: about 10%
Plating layer: a three-layer structure including a Cu plating layer, an Ni plating layer, and an Sn plating layer
Thickness of Cu plating layer: about 6 µm
Thickness of Ni plating layer: about 4 µm
Thickness of Sn plating layer: about 4 µm

(2) Specifications of Samples in Comparative Examples

Then, multilayer ceramic capacitors according to Comparative Examples under the following specifications were produced.

Comparative Example 1

A multilayer ceramic capacitor according to Comparative Example 1 is the same or substantially the same as the multilayer ceramic capacitor in Example 1, except that the underlying electrode layer does not contain Sn. The specifications will be hereinafter described in detail.

Structure of multilayer ceramic capacitor: two terminals
Dimensions L×W×T of multilayer ceramic capacitor (including design values): about 1.0 mm×about 0.5 mm×about 0.5 mm
Material of dielectric layer: $BaTiO_3$
Capacitance: 22 µF
Rated voltage: 4V
Structure of internal electrode
Third metal component: Ni
Fourth metal component: none
Structure of external electrode
Underlying electrode layer
First metal component: Ni
Second metal component: none
Content of second metal component: none
Ceramic material in underlying electrode layer: $BaTiO_3$
Content of ceramic material in underlying electrode layer: about 10%
Plating layer: a three-layer structure including a Cu plating layer, an Ni plating layer, and an Sn plating layer
Thickness of Cu plating layer: about 6 µm
Thickness of Ni plating layer: about 4 µm
Thickness of Sn plating layer: and 4 µm

Comparative Example 2

A multilayer ceramic capacitor according to Comparative Example 2 is the same or substantially the same as the multilayer ceramic capacitor in Example 2, except that the underlying electrode layer does not contain Sn. The specifications will be hereinafter described in detail.

Structure of multilayer ceramic capacitor: three terminals
Dimensions L×W×T of multilayer ceramic capacitor (including design values): about 1.0 mm×about 0.5 mm×about 0.5 mm
Material of dielectric layer: $BaTiO_3$
Capacitance: 15 µF
Rated voltage: 4V
Structure of internal electrode
Third metal component: Ni
Fourth metal component: none
Structure of external electrode
Underlying electrode layer
First metal component: Ni
Second metal component: none
Content of second metal component: none
Ceramic material in underlying electrode layer: $BaTiO_3$
Content of ceramic material in underlying electrode layer: about 10%
Plating layer: a three-layer structure including a Cu plating layer, an Ni plating layer, and an Sn plating layer
Thickness of Cu plating layer: about 6 µm
Thickness of Ni plating layer: about 4 µm
Thickness of Sn plating layer: about 4 µm

(3) Method of Moisture Resistance Reliability Test

In this case, ten samples of each Example and ten samples of each Comparative Example were mounted on a glass-epoxy substrate with eutectic solder. Then, insulation resistance values of these samples were measured. Then, the glass-epoxy substrate was placed in a high-temperature high-humidity bath, in which a voltage of about 3.2 V was applied to each sample for about 72 hours in an environment of about 125° C. and a relative humidity of about 95% RH. After the moisture resistance reliability test, the insulation resistance values of the samples were measured.

Then, the insulation resistance values of the samples were compared before and after the moisture resistance reliability test. Then, any sample showing an insulation resistance value decreased by one or more orders of magnitude was rated as defective and counted.

Evaluation results are shown in Table 1.

TABLE 1

|  | Number of Defectives Observed in Moisture Resistance Reliability Test (Pieces) |
| --- | --- |
| Example 1 | 0/10 |
| Example 2 | 0/10 |
| Comparative Example 1 | 10/10 |
| Comparative Example 2 | 10/10 |

(4) Experiment Results

As shown in Table 1, in each of multilayer ceramic capacitors as samples in Examples 1 and 2, the underlying electrode layer of the external electrode contains Ni as the first metal component that is a main component and Sn as the second metal component that is a sub-component. Thus, due to progress of densification of the fired external electrode, none of ten samples was rated as defective in the result of the moisture resistance reliability test.

In contrast, in each of the multilayer ceramic capacitors as samples in Comparative Examples 1 and 2, the underlying electrode layer of the external electrode contained only Ni as the first metal component but did not contain Sn as the second metal component that is a sub-component. Consequently, densification of the fired external electrode did not progress, and thus, all ten samples were rated as defective in the result of the moisture resistance reliability test.

In view of the above, the following is can be understood. Specifically, the underlying electrode layer of the external electrode contains Ni as the first metal component that is a main component and Sn as the second metal component that is a sub-component. Thus, Ni and Sn are partially alloyed in the underlying electrode layer, and therefore, the melting point is lowered. Accordingly, the sinterability of the underlying electrode layer is improved to thus activate the reaction of the alloy in the underlying electrode layer, and thus, densification of the external electrode progresses, with the result that formation of gaps that may occur in the underlying electrode layer is reduced or prevented. This enables reduction or prevention of occurrence of gaps through which moisture infiltrates during formation of a plating layer and the like, and thus, moisture does not infiltrate into each external electrode, so that moisture can be prevented from infiltrating also into the multilayer body. Consequently, insulation deterioration in the multilayer ceramic capacitor can be prevented. As a result, it was clarified that the multilayer ceramic capacitor can be improved in reliability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. Multilayer ceramic electronic component comprising:
a multilayer body including a plurality of first and second ceramic layers that are stacked, a first main surface and a second main surface that face each other in a height direction, a first side surface and a second side surface that face each other in a width direction orthogonal or substantially orthogonal to the height direction, and a first end surface and a second end surface that face each other in a length direction orthogonal or substantially orthogonal to the height direction and the width direction;
a first internal electrode layer on each of the first ceramic layers and exposed on the first end surface;
a second internal electrode layer on each of the second ceramic layers and exposed on at least one surface of the second end surface, the first side surface, and the second side surface;
a first external electrode connected to the first internal electrode layer and disposed on the first end surface; and
a second external electrode connected to the second internal electrode layer and disposed on the at least one surface on which the second internal electrode layer is exposed; wherein
the first external electrode includes a first underlying electrode layer;
the second external electrode includes a second underlying electrode layer; and
each of the first and second underlying electrode layers includes an alloy portion that includes an alloyed Ni as a first metal component and an alloyed Sn as a second metal component.

2. The multilayer ceramic electronic component according to claim 1, wherein the first internal electrode layer includes Ni as a third metal component and an Sn material as a fourth metal component.

3. The multilayer ceramic electronic component according to claim 2, wherein the first internal electrode layer includes a portion including an alloyed Ni defining the third metal component and an alloyed Sn material defining the fourth metal component.

4. The multilayer ceramic electronic component according to claim 2, wherein the Ni as the third metal component is a main component of the first internal electrode layer, and the Sn material as the fourth metal component is a sub-component of the first internal electrode layer.

5. The multilayer ceramic electronic component according to claim 2, wherein
a sum of the Ni as the third metal component and the Sn material as the fourth metal component is about 100 mol; and
a content of the Sn material is about 0.001 mol or more and about 0.1 mol or less.

6. The multilayer ceramic electronic component according to claim 1, wherein the second internal electrode layer includes Ni as a third metal component and an Sn material as a fourth metal component.

7. The multilayer ceramic electronic component according to claim 6, wherein the second internal electrode layer includes a portion including an alloyed Ni defining the third metal component and an alloyed Sn material defining the fourth metal component.

8. The multilayer ceramic electronic component according to claim 6, wherein the Ni as the third metal component is a main component of the second internal electrode layer, and the Sn material as the fourth metal component is a sub-component of the second internal electrode layer.

9. The multilayer ceramic electronic component according to claim 6, wherein
a sum of the Ni as the third metal component and the Sn material as the fourth metal component is about 100 mol; and
a content of the Sn material is about 0.001 mol or more and about 0.1 mol or less.

10. The multilayer ceramic electronic component according to claim 1, wherein the first internal electrode layer includes a portion including an alloyed Ni as a third metal component and an alloyed Sn material as a fourth metal component.

11. The multilayer ceramic electronic component according to claim 10, wherein the portion of the first internal electrode layer including the alloyed Ni as the third metal component and the alloyed Sn material as the fourth metal component includes an alloy layer.

12. The multilayer ceramic electronic component according to claim 11, wherein the alloy layer of the first internal electrode layer covers the first internal electrode layer.

13. The multilayer ceramic electronic component according to claim 10, wherein an end surface alloy layer including the alloyed Ni as the third metal component and the alloyed Sn material as the fourth metal component is provided at the interface between the first underlying electrode layer and the multilayer body.

14. The multilayer ceramic electronic component according to claim 1, wherein the second internal electrode layer includes a portion including an alloyed Ni as a third metal component and an alloyed Sn material as a fourth metal component.

15. The multilayer ceramic electronic component according to claim 14, wherein the portion of the second internal electrode layer including the alloyed Ni as the third metal component and the alloyed Sn material as the fourth metal component includes an alloy layer.

16. The multilayer ceramic electronic component according to claim 15, wherein the alloy layer of the second internal electrode layer covers the second internal electrode layer.

17. The multilayer ceramic electronic component according to claim 14, wherein an end surface alloy layer including the alloyed Ni as the third metal component and the alloyed Sn material as the fourth metal component is provided at the interface between the second underlying electrode layer and the multilayer body.

* * * * *